United States Patent
Herbst et al.

(10) Patent No.: US 8,686,664 B2
(45) Date of Patent: *Apr. 1, 2014

(54) METHOD AND SYSTEM FOR AUTOMATED LIGHTING CONTROL AND MONITORING

(75) Inventors: Joseph E. Herbst, Newberg, OR (US); Mark VanWagoner, Portland, OR (US)

(73) Assignee: Virticus Corporation, Beaverton, OR (US)

( * ) Notice: Subject to any disclaimer, the term of this patent is extended or adjusted under 35 U.S.C. 154(b) by 816 days.

This patent is subject to a terminal disclaimer.

(21) Appl. No.: 12/719,681

(22) Filed: Mar. 8, 2010

(65) Prior Publication Data

US 2011/0215735 A1    Sep. 8, 2011

(51) Int. Cl.
| G05F 1/00 | (2006.01) |
| H05B 37/02 | (2006.01) |
| H05B 39/04 | (2006.01) |
| H05B 41/36 | (2006.01) |
| H05B 37/00 | (2006.01) |
| H05B 39/00 | (2006.01) |
| H05B 41/00 | (2006.01) |

(52) U.S. Cl.
USPC .......................................... 315/297; 315/312

(58) Field of Classification Search
None
See application file for complete search history.

(56) References Cited

U.S. PATENT DOCUMENTS

| 6,608,453 B2 | 8/2003 | Morgan et al. |
| 2007/0057807 A1* | 3/2007 | Walters et al. ................ 340/825 |
| 2009/0002982 A1 | 1/2009 | Hu et al. |
| 2009/0072944 A1* | 3/2009 | Hayward ....................... 340/2.1 |

FOREIGN PATENT DOCUMENTS

| JP | 20080108074 | 5/2008 |
| KR | 20080072229 | 8/2008 |

\* cited by examiner

Primary Examiner — Douglas W Owens
Assistant Examiner — Dedei K Hammond
(74) Attorney, Agent, or Firm — Olympic Patent Works, PLLC

(57) ABSTRACT

Embodiments of the present invention are directed to automated control of lighting systems at individual-light-fixture, local, regional, and larger-geographical-area levels. One embodiment of the present invention comprises a hierarchical lighting-control system including an automated network-control center that may control up to many millions of individual lighting fixtures and lighting elements, regional routers interconnected to the network-control center or network-control centers by public communications networks, each of which controls hundreds to thousands of individual light fixtures, and light-management units, interconnected to regional routers by radio-frequency communications and/or power-line communications, each of which controls components within a lighting fixture, including lighting elements, associated ballasts, sensors, and other devices.

13 Claims, 23 Drawing Sheets

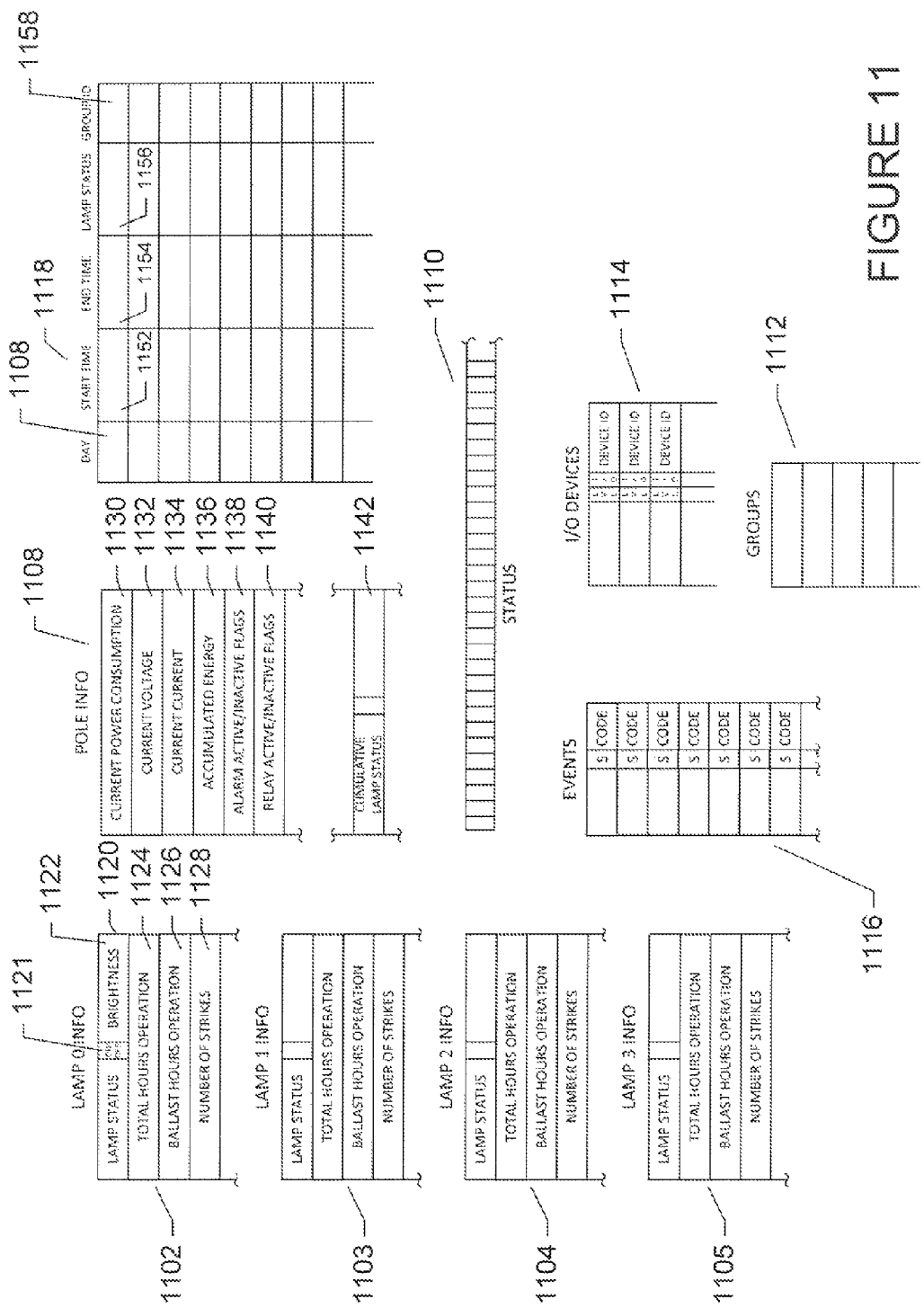

| COMMAND (Hex) | OPERATION |
|---|---|
| 00 | Set Time |
| 02 | Define Groups |
| 04 | Define Schedule |
| 06 | Define Input / Output |
| 08 | Force Lamp State |
| 0A | Report Status |
| 08 | Status Reply |
| 0C | Event |
| 0E | Set Operating House |
| 10 | Define Lamp Characteristics |
| 12 | Firmware Update |
| 70 | Backdoor Data |
| FE | Add/Remove Rialto |

FIGURE 13

| Byte # | Data Type | Comments |
|---|---|---|
| 0 | Day of Week | Expire=0, only 1 day bit may be set |
| 1-2 | Time of Day | Current Time |
| 3-4 | Time of Day | Sunrise Time |
| 5-6 | Time of Day | Sunset Time |

FIGURE 14A

| Byte # | Data Type | Comments |
|---|---|---|
| 0-7 | Group ID | 0-7 group ID(s) |

FIGURE 14B

| Byte # | Data Type | Comments |
| --- | --- | --- |
| 0 | Unsigned 8 bit | Operation code: 0 = clear entire Schedule, 1 = add schedule item, 2= schedule definition complete. |
| 1 | Day of Week | Auto-expire bit is valid |
| 2-3 | Start Time | 0-1439 (decimal). If a valid event code is specified in byte 4, this is interpreted as the duration of the event-driven lamp state |
| 4 | Event Code | Event that changes lamp states |
| 5 | Event Group | Group of the event code |
| 6-7 | Lamp State | Lamp 1 |
| 8-9 | Lamp State | Lamp 2 |
| 10-11 | Lamp State | Lamp 3 |
| 12-13 | Lamp State | Lamp 4 |

FIGURE 14C

| Byte # | Data Type | Comments |
| --- | --- | --- |
| 0 | I/O Device | Defines the selected device |
| 1 | Event Code | Defines what the device is |
| 2 | Group ID | Defines the Group to be used in the associated event message |

FIGURE 14D

| Byte # | Data Type | Comments |
| --- | --- | --- |
| 0 | Unsigned 8 bit | 0=force off, non-zero = force on. |
| 1 | Group ID | |
| 2-3 | Lamp State | Lamp 1 |
| 4-5 | Lamp State | Lamp 2 |
| 6-7 | Lamp State | Lamp 3 |
| 8-9 | Lamp State | Lamp 4 |

FIGURE 14E

| Byte # | Data Type | Comments |
|---|---|---|
| 0 | Unsigned 8 bit | Status Selector.0 = Rialto status, 1-4 = lamp status, 5- FF reserved. |

FIGURE 14F

| Byte # | Data Type | Comments |
|---|---|---|
| 0-1 | Rialto Status | Bit field |
| 2-4 | Run Time | Rialto run time hours |
| 5-6 | Instantaneous voltage | Pole voltage |
| 7-8 | Instantaneous current | Pole current |
| 9-10 | Instantaneous power | Pole Power |
| 11-14 | Accumulated Energy | Accumulated pole power |

FIGURE 14G

| Byte # | Data Type | Comments |
|---|---|---|
| 0-1 | Lamp State | Lamp state |
| 2-4 | Run Time | Lamp run time hours |
| 5-7 | Run Time | Ballast run time hours |
| 8-9 | Strike Count | Ballast strike count |
| 10 | Alarms | Bit 0 = 1= Lamp runtime > threshold<br>Bit 1 = 1= Ballast runtime >threshold<br>Bit 2 = 1=Strike count>threshold<br>Bit 3-7 = 0 |

FIGURE 14H

| Byte # | Data Type | Comments |
|---|---|---|
| 0 | Event State | The event that occurred |
| 1 | Group ID | Group that should act on the event |

FIGURE 14I

| Byte # | Data Type | Comments |
|---|---|---|
| 0 | Unsigned 8 bit | Lamp ID 0-3 |
| 1-3 | Run Time | Lamp 'n' run time hours |
| 4-6 | Run Time | Lamp 'n' alarm hours threshold |
| 7-9 | Run Time | Lamp 'n' ballast run time hours |
| 10-12 | Run Time | Lamp 'n' ballast alarm hours threshold |
| 13-14 | Strike Count | Lamp 'n' strike count |
| 15-16 | Strike Count | Lamp 'n' strike count alarm threshold |
| 17-32 | | $2^{nd}$ lamp data, if used, starting w/lamp ID |
| 33-49 | | $3^{rd}$ lamp data, if used, starting w/ lamp ID |

FIGURE 14J

| Byte # | Data Type | Comments |
|---|---|---|
| 0 | Unsigned 8 bit | Lamp ID 0-3 |
| 1-2 | Unsigned 16 bit | Flags, see below |
| 3-4 | Unsigned 16 bit | Strike time in seconds |
| 5 | Unsigned 8 bit | Relight time in minutes |
| 6-7 | Inst. Power | Lamp power draw in watts |
| 8-9 | Inst. Power | Lamp voltage (RMS) |
| 10-11 | Inst. Power | Ballast power draw in watts |
| 12 | Unsigned 8 bit | Lowest Dim Percentage |
| 13 | Unsigned 8 bit | Number of Segments |

FIGURE 14K

| Byte # | Data Type | Comments |
|---|---|---|
| 0 | Unsigned 8 bit | Item to be programmed:<br>0: Coronado<br>1: Rialto Atmel 168/328 App. Processor<br>2: Rialto STM8 App. Processor<br>3: TI Zigbee Processor<br>4-FF: Reserved |
| 1-4 | Unsigned 32 bit | Size of new firmware in bytes |

FIGURE 14L

| Byte # | Data Type | Comments |
|---|---|---|
| 0 | Unsigned 8 bit | A value 0-FF that causes the reply to return whatever data Jeff thinks is needed. |

FIGURE 14M

| Byte # | Data Type | Comments |
|---|---|---|
| 0 | Unsigned 8 bit | 0 = Remove Rialto, 1 = Add Rialto |

FIGURE 14N

METHOD AND SYSTEM FOR AUTOMATED LIGHTING CONTROL AND MONITORING

TECHNICAL FIELD

The present invention is related to lighting systems, and, in particular, to automated control systems for controlling and monitoring individual lighting elements, lighting elements associated with individual fixtures, and arbitrarily sized groups of lighting fixtures located across local, regional, and larger geographical areas.

BACKGROUND OF THE INVENTION

Lighting systems for public roadways, thoroughfares, and facilities, private and commercial facilities, including industrial plants, office-building complexes, schools, universities, and other such organizations, and other public and private facilities account for enormous yearly expenditures of energy and financial resources, including expenditures for lighting-equipment acquisition, operation, maintenance, and administration. Because of rising energy costs, falling tax-generated funding for municipalities, local governments and state governments, and because of cost constraints associated with a variety of different enterprises and organizations, expenditures related to acquiring, maintaining, servicing, operating, and administering lighting systems are falling under increasing scrutiny. As a result, almost all organizations and governmental agencies involved in acquiring, operating, maintaining, and administering lighting systems are seeking improved methods and systems for control of lighting fixtures in order to lower administrative, maintenance, and operating costs.

SUMMARY OF THE INVENTION

Embodiments of the present invention are directed to automated control of lighting systems at individual-light-fixture, local, regional, and larger-geographical-area levels. One embodiment of the present invention comprises a hierarchical lighting-control system including an automated network-control center that may control up to many millions of individual lighting fixtures and lighting elements, regional routers interconnected to the network-control center or network-control centers by public communications networks, each of which controls hundreds to thousands or more of individual light fixtures, and light-management units, interconnected to regional routers by radio-frequency communications and/or power-line communications, each of which controls components within a lighting fixture, including lighting elements, associated ballasts, sensors, and other devices.

BRIEF DESCRIPTION OF THE DRAWINGS

FIG. 11 shows the type of data stored within each light-management unit according to certain embodiments of the present invention.

FIG. 13 shows various commands used in router-to-light-management-unit communications according to certain embodiments of the present invention.

FIGS. 14A-N show the data contents of the various commands and replies discussed above with reference to FIG. 13.

DETAILED DESCRIPTION OF THE INVENTION

Figure 1:
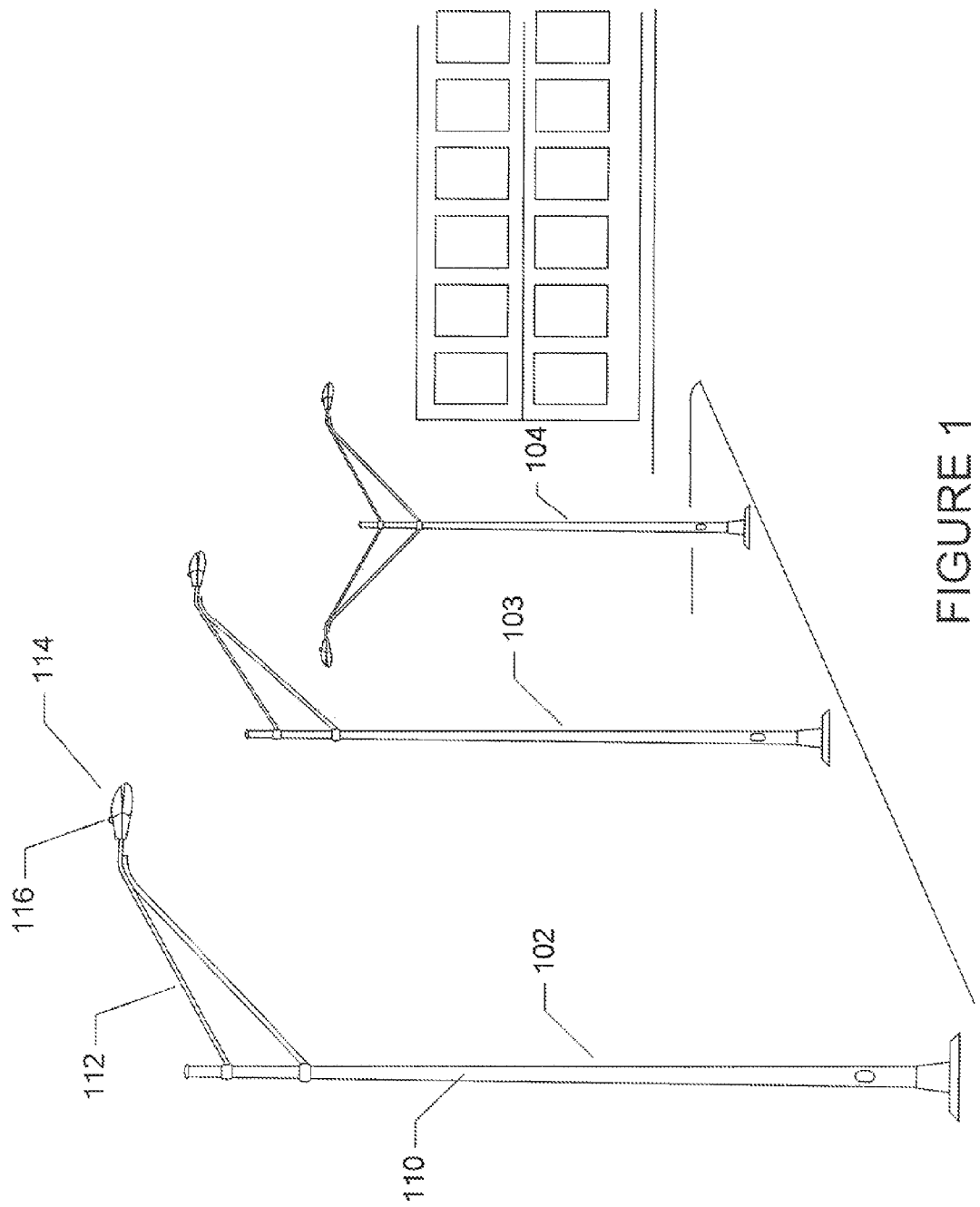
FIG. 1 illustrates a portion of a traditional lighting system observed in parking lots, along thoroughfares and roadways, and within industrial sites, school facilities, and office-building complexes.

There are many different types of lighting fixtures, lighting elements, or luminaires, and lighting applications. FIG. 1 illustrates a portion of a traditional lighting system observed in parking lots, along thoroughfares and roadways, and within industrial sites, school facilities, and office-building complexes. Such lighting systems commonly employ street-light fixtures, such as street-light fixtures 102-104 in FIG. 1. Each street-light fixture includes a rigid, vertical pole 110 and arms or brackets 112, through which internal electrical wiring runs, that together support one or more lighting units 114. Each lighting unit generally includes one or more lighting elements and associated electrical ballasts that limit voltage drops across, and current drawn by, lighting elements and that buffer voltage and/or current surges and shape the input voltage or current in order to provide a well-defined output voltage or current for driving the lighting elements. Many different types of lighting elements are currently used, including light-emitting-diode ("LED") panels, inductive-lighting, or compact fluorescent, elements, high-pressure-sodium lighting elements, mercury-halide lighting elements, incandescent lighting elements, and other types of lighting elements. A series of lighting fixtures is often interconnected along a common electrical path within a public-utility electrical grid. Lighting fixtures are often controlled by photocell switches 116, which respond to ambient illumination and/or lack of ambient illumination, to power on lighting elements during periods of darkness and power off lighting elements when adequate ambient daylight is available.

Figure 2:
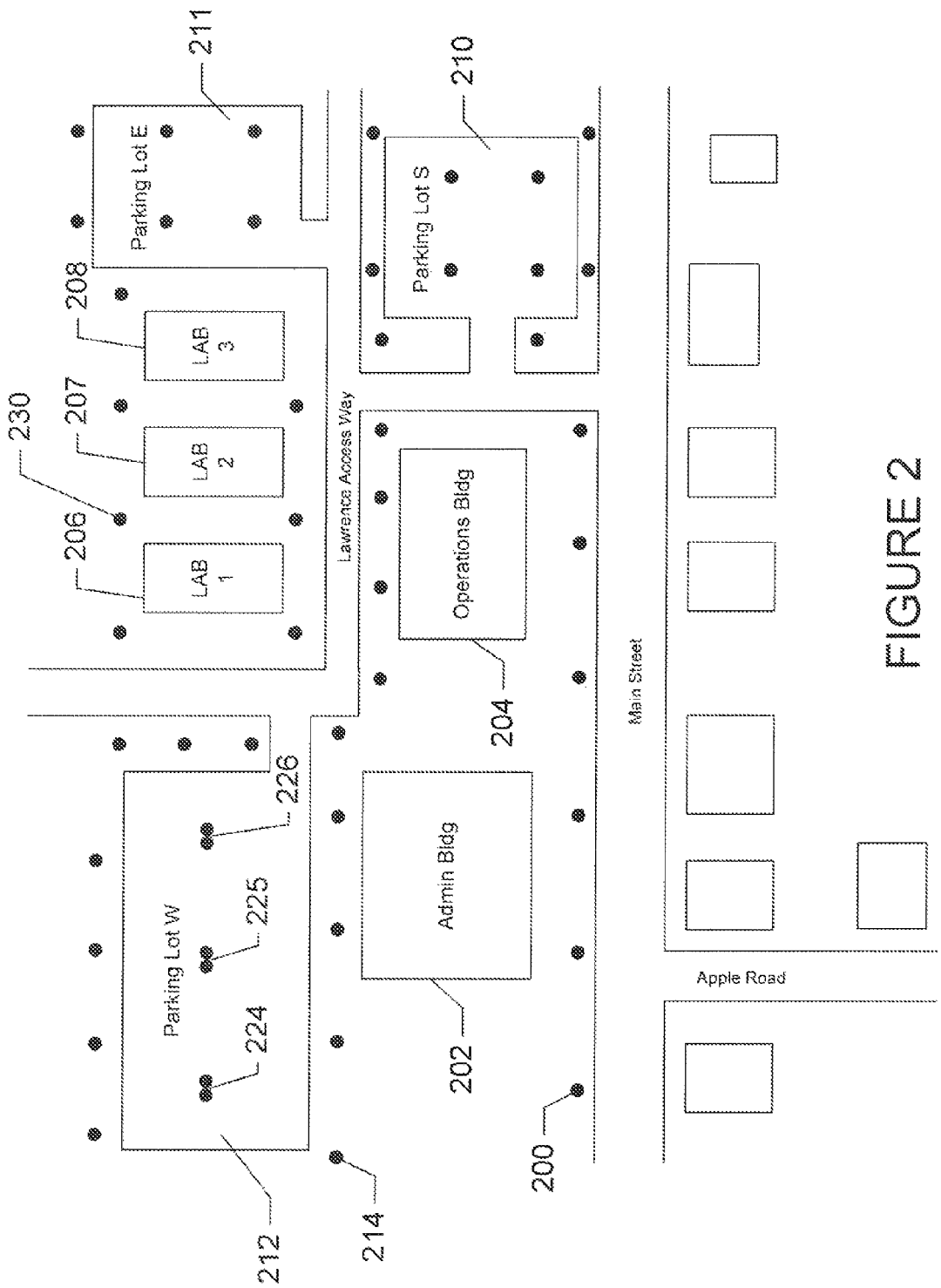
FIG. 2 shows a modestly sized industrial or commercial site with associated lighting-fixture locations.

Even modestly sized industrial, commercial, educational, and other facilities often employ a large number of lighting fixtures for a variety of different purposes. FIG. 2 shows a modestly sized industrial or commercial site with associated lighting-fixture locations. The industrial site shown in FIG. 2 includes an administration building 202, an operations building 204, three laboratory buildings 206-208, and three parking lots 210-212. The locations of lighting fixtures are shown as filled disks, such as filled disk 214. Certain of the lighting fixtures are located along roadways, such as lighting fixture 220, and may serve to illuminate the roadways as well as illuminating portions of buildings adjacent to the roadways, building entrances, walkways, and other portions of the environment surrounding the buildings and roadways. This type of lighting provides safety for operators of motor vehicles and pedestrians, and may address certain security concerns. Other lighting fixtures, including double-arm lighting fixtures 224-226, illuminate parking lots, and are employed primarily for the convenience of parking-lot users as well as for security purposes. Other lighting fixtures, including the lighting fixtures that surround the laboratory buildings 206-208, including lighting fixture 230, may serve primarily for facilitating security in and around high-security buildings and areas.

There are many problems associated with even simple lighting systems, such as those shown in FIGS. 1 and 2. Photocell control of lighting fixtures is relatively crude, providing 100 percent power to light fixtures during periods of darkness and no power to light fixtures during periods of adequate ambient light. Thus, lighting is controlled primarily according to day length, rather than to the needs of facilities and people who work in, and travel through, the facilities. Photocells and photocell-control circuitry may fail, leading to lighting fixtures remaining constantly powered on, significantly shortening the useful length of lighting elements and significantly increasing energy consumption by lighting fixtures. As discussed with reference to FIG. 2, various different lighting fixtures within a facility may be used for different purposes, and therefore could optimally be controlled according to different schedules and lighting-intensity requirements, were such control possible. However, current lighting systems generally lack effective means for differentially operating lighting fixtures and lighting elements within them. For these and many other reasons, manufacturers and vendors of lighting fixtures and lighting systems, organizations and agencies responsible for acquiring, operating, maintaining, and administering lighting systems, and ultimately all who enjoy the benefits of lighting systems continue to seek improved systems for controlling lighting systems, so that lighting can be provided as cost effectively as possible to meet various different lighting needs and requirements.

As discussed above, current lighting systems, in which individual lighting fixtures are controlled generally by photocells, and in which groups of electrically interconnected lighting fixtures may be additionally controlled at the circuit level by timers and other crude control mechanisms, do not provide flexibility and precision of control needed to optimize control of lighting systems in order to provide needed lighting intensities at particular times on an individual-lighting-fixture basis, monitor lighting fixtures for output, component failure, and other operational characteristics, and provide local-area-wide, regional, and larger-geographical-area-wide approaches to control of lighting systems. By contrast, embodiments of the present invention provide precise control of lighting fixtures, regardless of electrical-connection topologies, in local, regional, and larger areas through automated control systems, public communications networks, including the Internet, radio-frequency communications, and power-line communications. Embodiments of the present invention thus provide for flexible, scheduled, and controlled operation of lighting fixtures down to the granularity of individual lighting elements within individual lighting fixtures and up to arbitrarily designated groups of lighting fixtures that may include millions of lighting fixtures distributed across large geographical areas. In addition, embodiments of the present invention provide for automated monitoring of lighting elements, lighting fixtures, and the environment surrounding lighting fixtures made possible by flexible control of light-management units, lighting-fixture-embedded sensors, and bi-directional communications between light-management units, routers, and network-control centers. Embodiments of the present invention provide for control of active components included in lighting fixtures, including automated activation of heating elements, failure-amelioration circuitry, and other such local functionality by the hierarchical control systems that represent embodiments of the present invention.

Figure 3A:
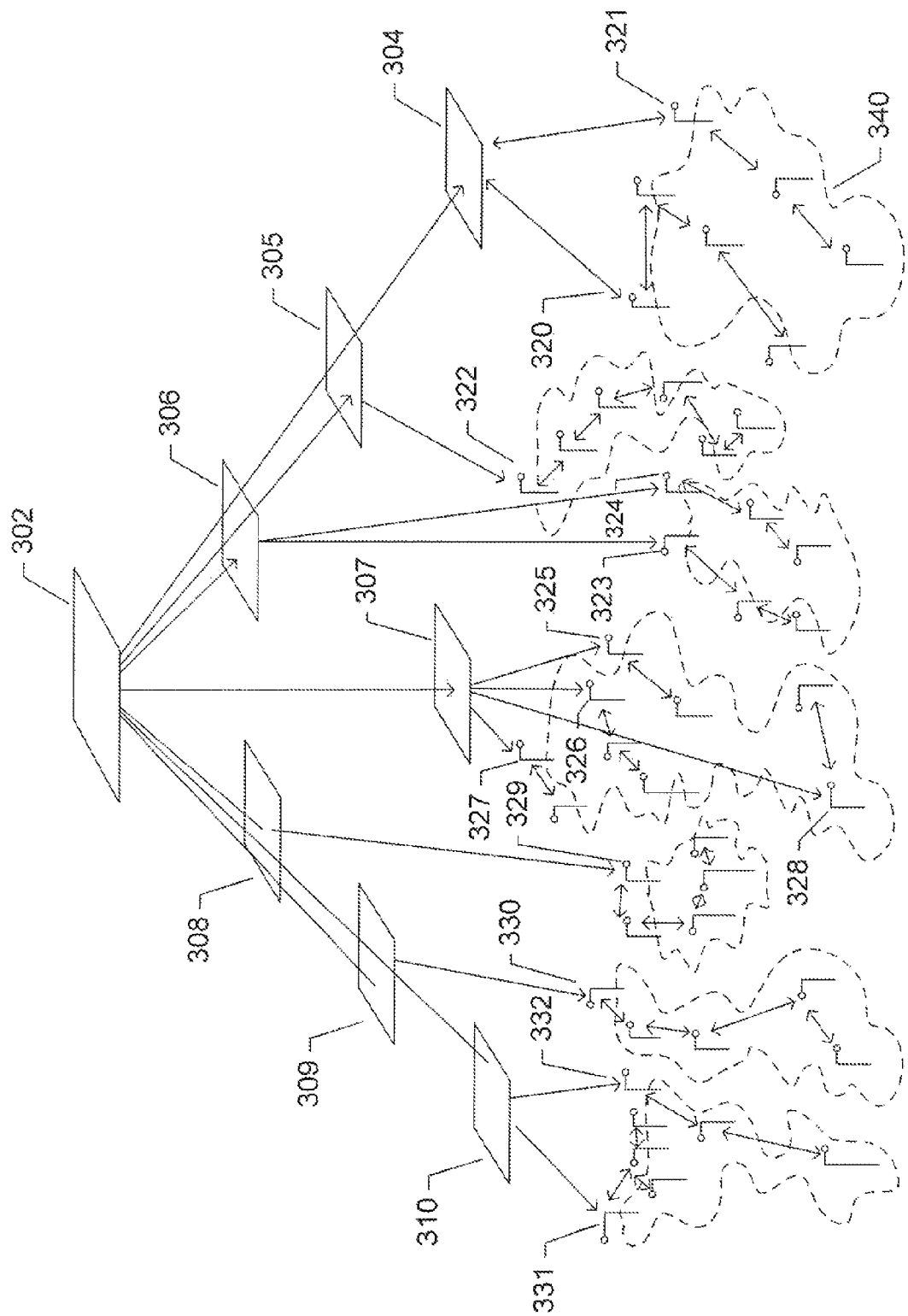
FIGS. 3A-B illustrates a conceptual approach to lighting-system control that represents one embodiment of the present invention.
Figure 3B:
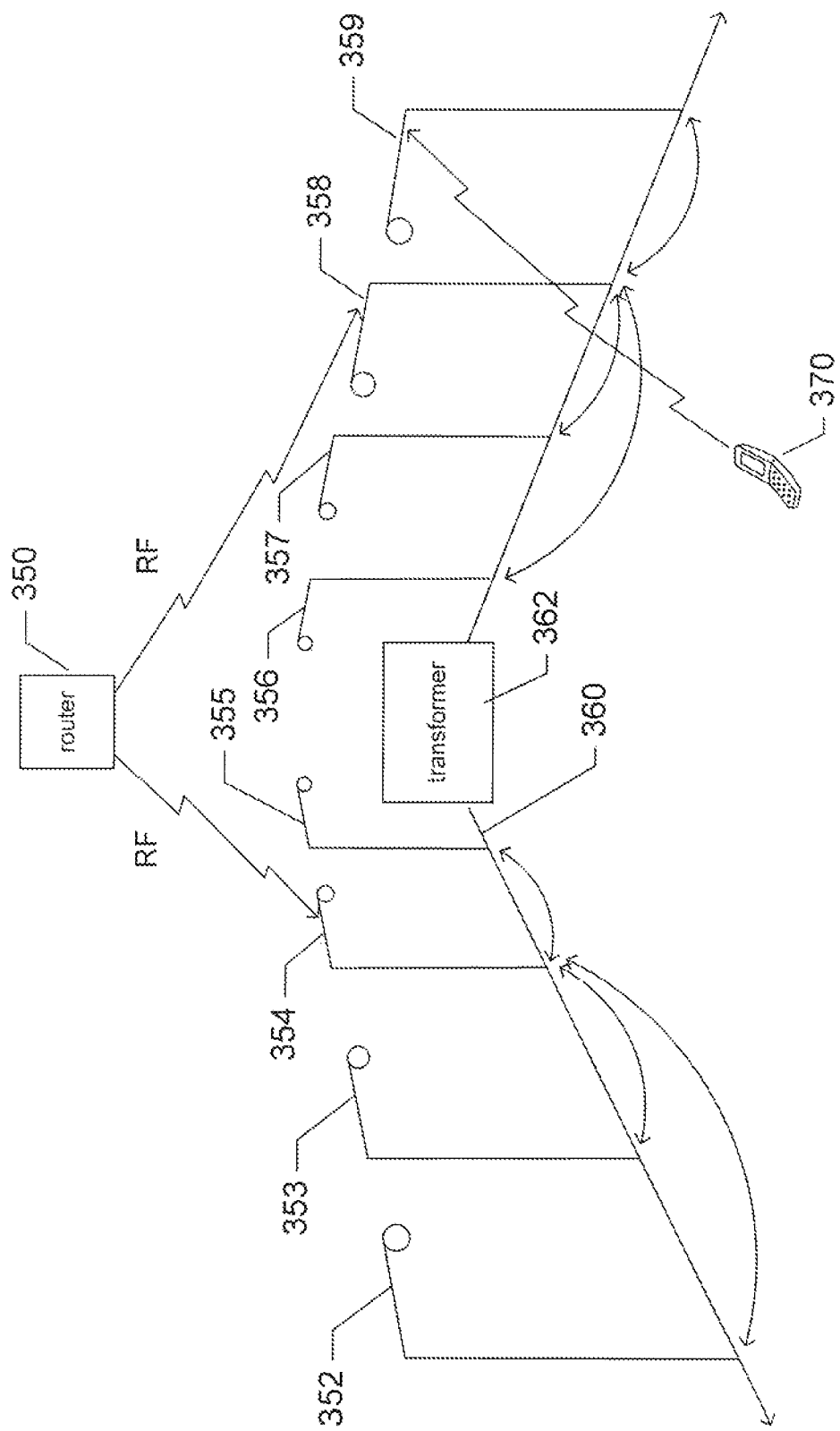

FIGS. 3A-B illustrates a conceptual approach to lighting-system control that represents one embodiment of the present invention. According to this embodiment of the present invention, lighting-system control is implemented hierarchically, with a top-level network-control center 302 directly communicating with multiple routing devices 304-310, each of which, in turn, communicates with one or more radio-frequency ("RF")-enabled bridging lighting-fixture-management units ("LMUs") 320-331 within individual fixtures that control operation of the lighting fixtures and that, in turn, communicate with one or more end-point LMUs within individual lighting fixtures via power-line communications. In general, the network-control center communicates with routers via network communications, including the Internet. However, network-control centers may also employ cellular telephone network communications, radio-frequency communications, and other types of communications in addition to network communications, in alternative embodiments. The routers intercommunicate with LMUs via radio-frequency communications, power-line communications, and, in alternate embodiments of the present invention, using other types of communications. In certain embodiments of the present invention, RF-enabled, bridging LMUs intercommunicate with routers using radio-frequency communications, and the RF-enabled, bridging LMUs communicate with additional end-point LMUs via power-line communications.

Each router, such as router 304, is associated with a number of individual lighting fixtures containing LMUs, such as the lighting fixtures within the region enclosed by dashed line 340 in FIG. 3, that intercommunicate with the router to provide control of the lighting fixtures. The routers, in turn, communicate with a network-control center 302 that provides for centralized, automated control of all of the lighting fixtures controlled by all of the routers that communicate with the network-control center. In one embodiment of the present invention, there are four levels within the hierarchy of controllers: (1) the centralized network-control center 302; (2) a number of routing devices 304-310; (3) RF-enabled bridging LMUs; and (4) additional end-point LMUs that communicate with the RF-enabled bridging LMUs via power-line communications. In alternative embodiments of the present invention, additional hierarchical levels may be included so that, for example, multiple network-control centers may communicate with a higher-level central control system for control of a very large geographical region. Alternatively, multiple geographically separated network-control centers may be implemented to intemperate as a distributed network-control center. Note that the lighting fixtures controlled through a particular router, such as the lighting fixtures within the area surrounded by dashed curve 340, are not necessarily geographically distinct from the lighting fixtures controlled by another router. The LMUs contained within individual lighting fixtures provide policy-driven, individualized, automated control over each of one or more lighting elements within the lighting fixture, provide for manual control of lighting elements, receive and process data from sensors, and control various active devices within lighting fixtures. Up to 1,000 or more LMUs may communicate with, export data to, and receive policy directives and data from, a particular routing device, and the network-control center may communicate with, receiving data from, and export policy directives to, up to 1,000 or more routing devices. Thus, the network-control center may provide automated control of a million or more individual lighting fixtures.

Figure 4:
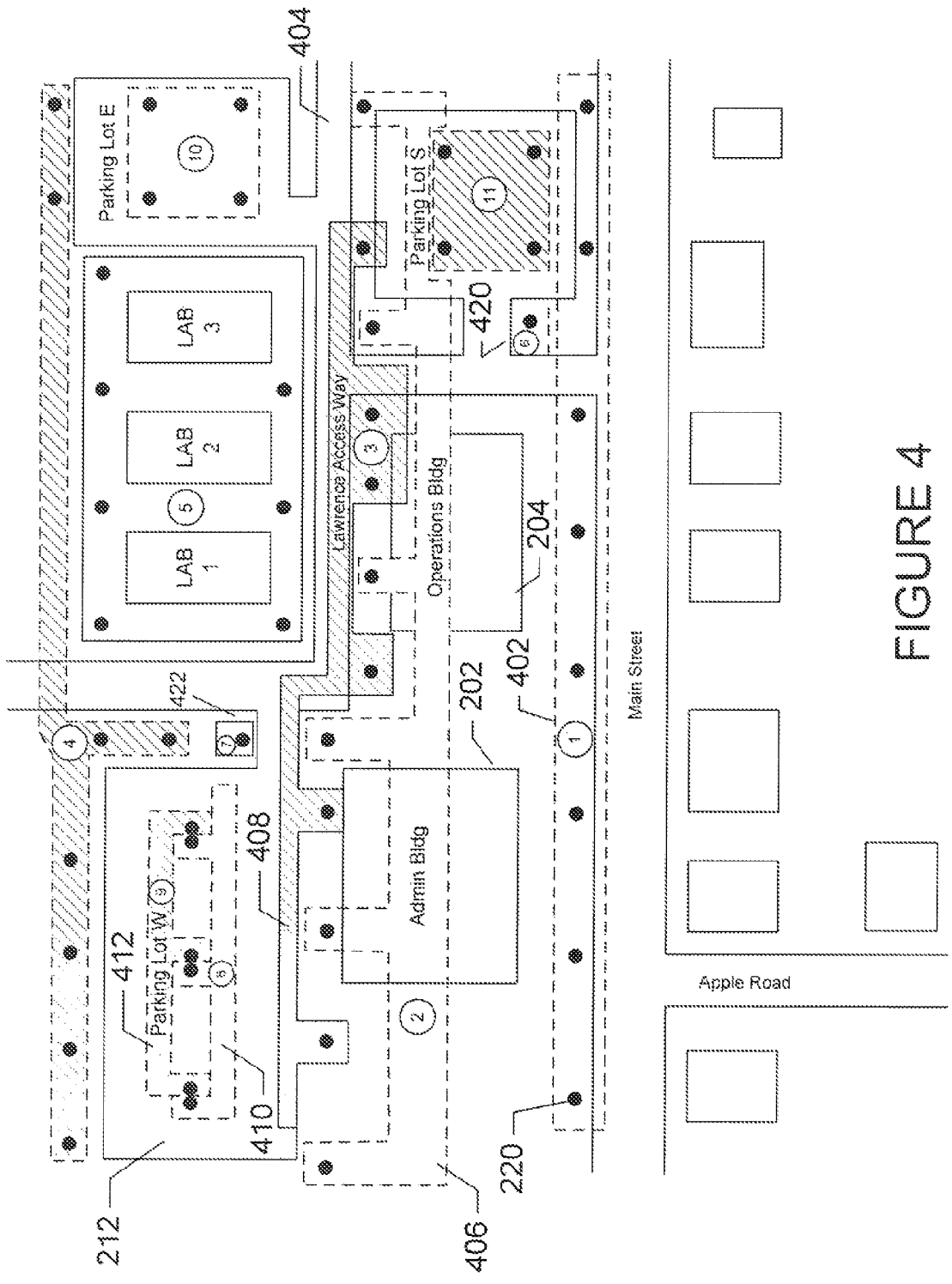
FIG. 4 illustrates, using the same industrial-site layouts shown in FIG. 2, groupings of individual lighting fixtures to facilitate automated control, as made possible by lighting-control systems that represent embodiments of the present invention.

While embodiments of the present invention allow individual lighting elements within individual lighting fixtures to be manually controlled from user interfaces provided by routing devices and user interfaces provided by the network-control center, manual control would be tedious and error prone. Automated lighting-control systems that represent embodiments of the present invention provide the ability to logically aggregate individual lighting fixtures into various different groups of lighting fixtures for control purposes. FIG. 4 illustrates, using the same exemplary industrial-site layout shown in FIG. 2, groupings of individual lighting fixtures to facilitate automated control, made possible by lighting-control systems that represent embodiments of the present invention. As shown in FIG. 1, the various different lighting fixtures, represented by filled disks, such as filled disk 220, are combined into 11 different control groups. Lighting fixtures along a public thoroughfare, including lighting fixture 220, are grouped together into a first group 402, labeled with the group number "1." Lighting fixtures behind the administration building and operations buildings 202 and 204, along a smaller roadway 404 and a large parking lot 212, are divided into two groups: (1) group 2 (406 in FIG. 4); and (2) group 3 (408 in FIG. 4). By partitioning these lighting fixtures into two groups, alternate lights along the roadway and parking lot can be activated on alternate days, lowering energy consumption and increasing lighting-element operational lifetimes. Alternatively, all of these lighting elements could be combined in a single group, and operated at lower light-intensity output in order to achieve similar purposes. Similarly, the dual-arm lighting elements within parking lot 212 are divided into two groups 410 and 412 so that lighting elements on only a single arm of each dual-arm lighting fixtures are powered on during a given day. Groups can be as small as individual lighting fixtures, such as groups 6 and 7 (420 and 422 in FIG. 4) or even as small as individual lighting elements within lighting fixtures. The hierarchical, automated control of lighting can be feasibly scaled, according to various embodiments of the present invention, to control all of the lighting fixtures within an entire nation or continent. The hierarchical implementation of the automated lighting control system that represents one embodiment of the present invention provides both scalability and communications flexibility. As one example, FIG. 3B shows a portion of an automated lighting-control system that uses a number of different types of communications methodologies. In FIG. 3B, a router 350 manages LMUs within eight different lighting fixtures 352-359. The lighting fixtures are partitioned into two different groups, including a first group 352-355 serially interconnected by a first power line 360 emitted from a transformer 362 and a second group 356-359 serially interconnected by a second power line 364 emitted from the transformer 362. Were both groups of lighting fixtures connected to a single power line, without the transformer 362 separating the two groups of lighting fixtures, all of the LMUs within the lighting fixtures could directly communicate with the router using only power-line communications. However, power-line communications cannot bridge transformers 362 and various other electrical-grid components. It would be possible to use two routers, one for each group of lighting fixtures, and interconnect each router to its respective group of lighting fixtures using power-line communications. However, a two-router implementation would involve connection and location constraints with regard to the routers, unnecessary duplication of router functionality, and higher cost. Instead, according to various embodiments of the present invention, the router 350 communicates by radio-frequency communications with RF-enabled, bridging LMUs in each of lighting fixtures 354 and 358. Each RF-enabled, bridging LMU intercommunicates with the remaining lighting fixtures of the group of lighting fixtures in which the bridging LMU is located using power-line communications. The bridging LMUs serve both as a local LMU within a lighting fixture as well as a communications bridge through which end-point LMUs in each group can receive messages from, and transmit messages to, the router 350. Thus, radio-frequency communications and RF-enabled, bridging LMUs provide a cost-effective and flexible method for bridging transformers and other power-line-communications-interrupting components of an electrical system. In addition, each LMU may include cell-phone-communications circuitry to allow the LMU to communicate directly with a cellular telephone 370. A cellular telephone can act as a bridge to a router or as a specialized, local router, to enable maintenance personnel to manually control an LMU during various monitoring and servicing activities.

Figure 5:
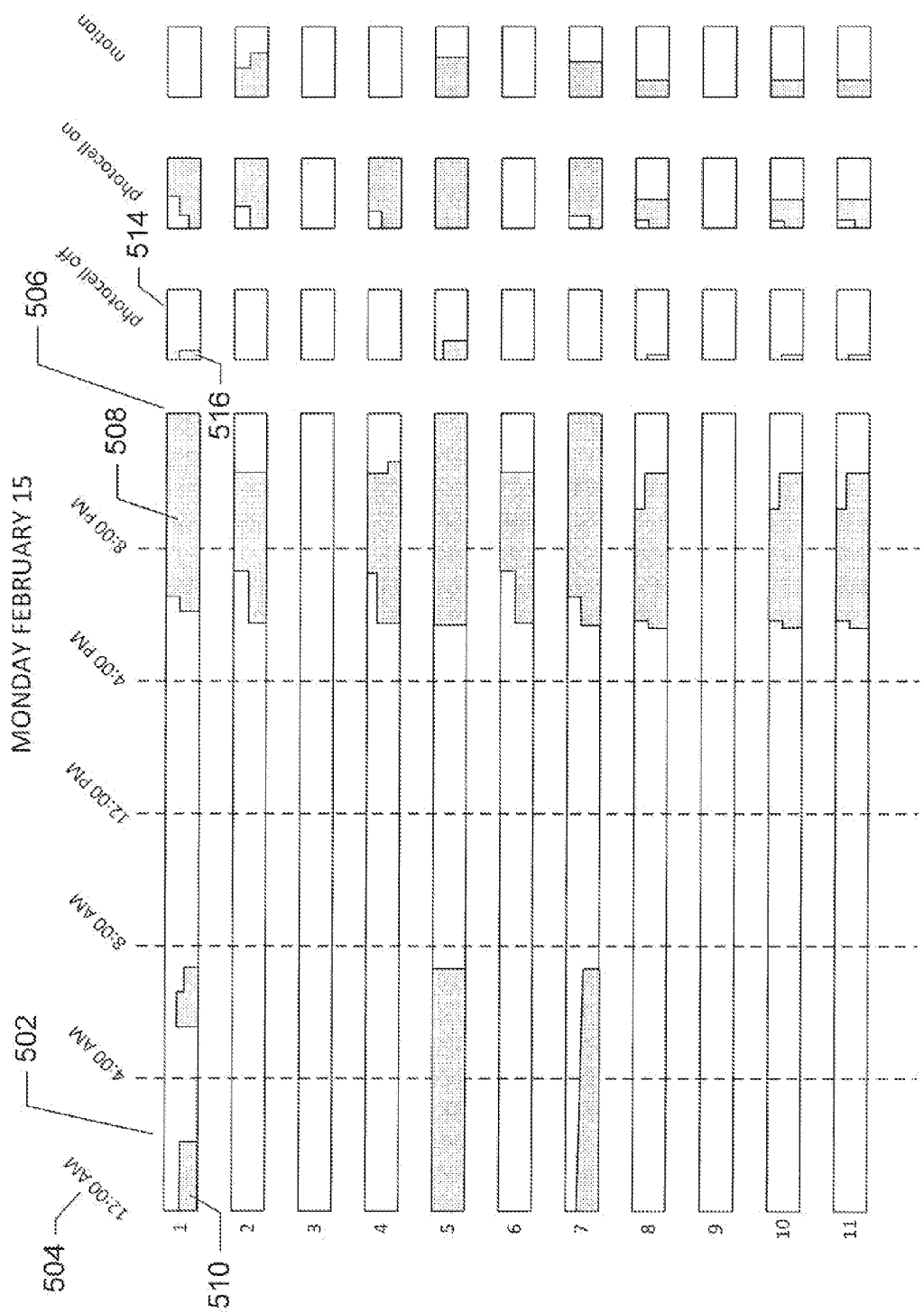
FIG. 5 illustrates a displayed schedule for automated control of the various groups of lighting fixtures shown in FIG. 4 according to certain embodiments of the present invention.

In certain embodiments of the present invention, LMUs control operation of lighting elements within lighting fixtures according to internally-stored schedules. FIG. 5 illustrates a displayed schedule for automated control of the various groups of lighting fixtures shown in FIG. 4 according to certain embodiments of the present invention. Schedules may be displayed, in various ways, by router and network-control-center user-interface routines, allowing interactive definition, modification, and deletion of schedules by authorized users. As shown in FIG. 5, a schedule for lighting-element operation within the lighting fixtures of each of the 11 groups shown in FIG. 4 is provided for a particular day. Each horizontal bar, such as horizontal bar 502, represents the schedule for operation of lighting elements within the lighting fixtures of a particular group according to the time of day. In certain embodiments of the present invention, entire lighting fixtures, including all lighting elements within the lighting fixtures, are assigned to groups, while in alternative embodiments of the present invention, individual lighting elements within lighting fixtures may be separately assigned to groups. The time of day increments from 12:00 a.m., at the left-hand edge of the horizontal bar 504, to 12:00 p.m. 506 at the right-hand edge of the horizontal bar. Shaded regions within the horizontal bar, such as shaded region 508 in horizontal bar 502, indicate times during which the lighting elements should be powered on. The heights of the shaded regions indicate the level to which the lighting element should be powered on. For example, shaded region 510 in horizontal bar 1 indicates that the lighting elements within the lighting fixtures of group 1 should be powered on to 50 percent of maximum intensity between 12:00 a.m. and 2:00 a.m., while the right-hand portion of shaded region 508 indicates that the lighting elements within the lighting fixtures within group 1 should be powered on to maximum intensity from 6:30 p.m. until midnight.

In addition, event-driven or sensor-driven operational characteristics can be defined for each group. For example, in FIG. 5, small horizontal bars, such as horizontal bar 514, indicate how the lighting elements should be operated when various different events occur. For example, horizontal bar 514 indicates that, in the event that the photocell output transitions from on to off, indicating that the ambient lighting has increased sufficiently to trip the photocell-signal-output threshold, the lights, when already powered on at or above 50% of maximum intensity, should be operated for an additional 15 minutes at 50 percent of maximum light-intensity output, represented by shaded bar 316, and then powered off. Operational characteristics can be specified for the photocell-on event, indicating a transition from adequate lighting to darkness, and for an input signal from a motion sensor indicating motion within the area of a lighting fixture. Operational characteristics for many additional events may be specified, as well as operational characteristics for additional controllable devices and functionality, including heating elements activated to remove snow and ice, various failure-recovery and fail-over systems, and other such devices and functionality.

There are many different approaches to specifying lighting-element operation and many different considerations for providing the different operational characteristics represented by the different horizontal bars for each group shown in FIG. 5, which in turn represent encoded operational schedules and event-related operational directives. For example, it would make no sense to power on lighting elements in response to a photocell-off event. The intent of the small shaded bar 516 within horizontal bar 514 is that, had the lights been powered on to greater than 50 percent of maximum intensity, lighting elements should be powered down to 50 percent of maximum intensity for a brief period of time before being powered off entirely. Thus, a combination of the time-incremented, large horizontal bar 502 and smaller horizontal bar 514 may specify that, at any point in time, the light should be powered on to the minimum power level indicated in the time-of-day schedule bar and the shorter horizontal bar corresponding to the photocell-off event. However, in other cases, light may need to be powered on to the maximum power level indicated in the time-of-day schedule bar and a different, shorter horizontal bar corresponding to a different type of event. In general, the ultimate operational characteristics of a light fixture, implemented by an LMU installed within the light fixture, may be defined by arbitrary Boolean and relational-operator expressions or short interpreted scripts or computer programs that compute, for any particular point in time, based on sensor input signals and on the stored time-based schedule and stored operational characteristics associated with particular events, the degree to which the lighting element should be powered on.

Figure 6:
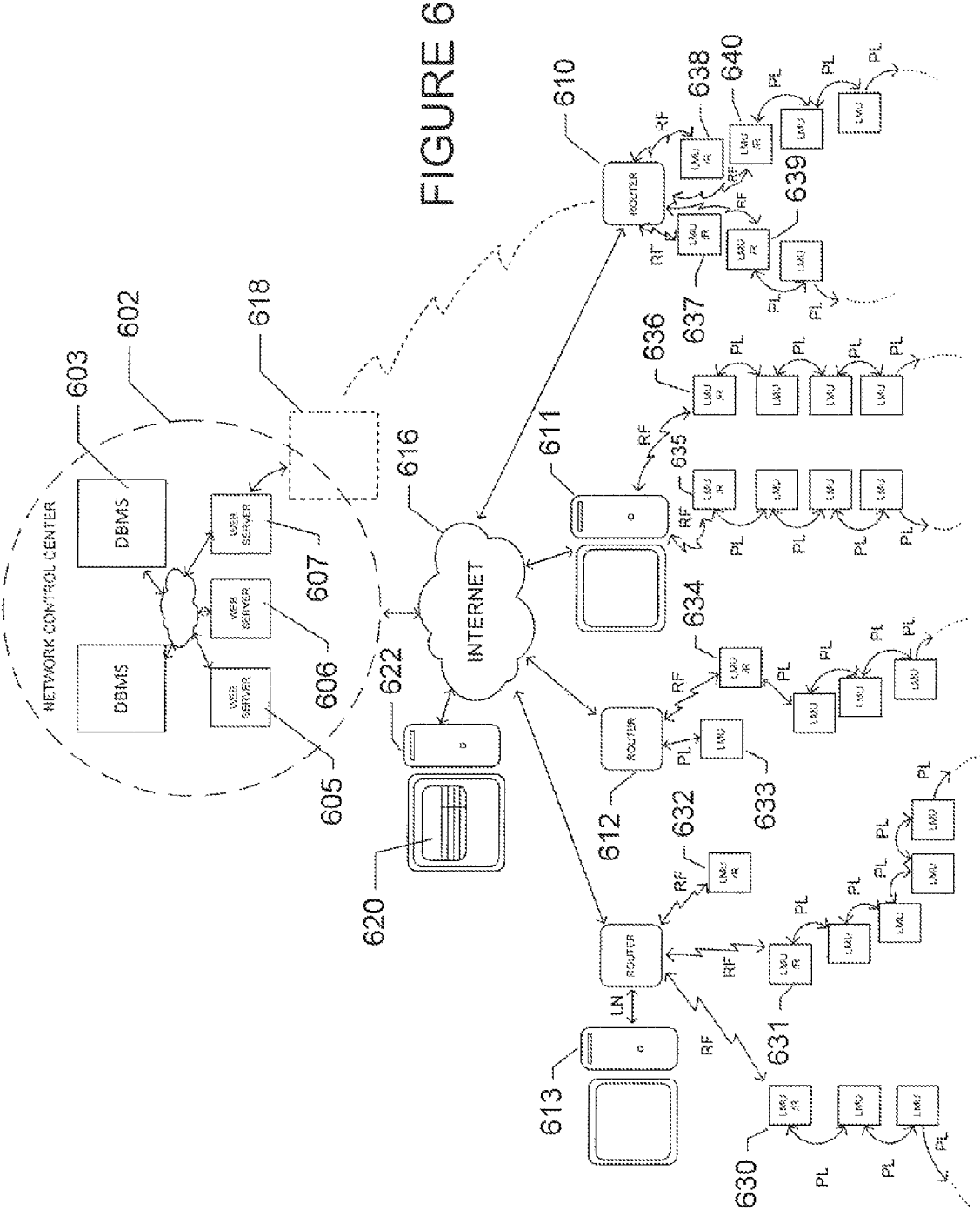
FIG. 6 provides a generalized architecture for the automated hierarchical lighting-control system that represents one embodiment of the present invention.

FIG. 6 provides a generalized architecture for the automated hierarchical lighting-control system that represents one embodiment of the present invention. Large-area control is exercised over many lighting fixtures within a large geographical area via automated control programs running within a network-control center 602. The network-control center includes, in addition to the control programs, one or more relational database management servers 603 or other types of data-storage systems and multiple web servers, or other interface-serving systems, 605-607 that together comprise a distributed, automated lighting-control-system network-control center. The network-control center web servers serve lighting-system-control information to multiple routers 610-613 via the Internet 616 or via radio-frequency transmitters 618. In addition, the network-control center may provide a web-site-based network-control-center user interface 620 via a personal computer or work station 622 interconnected with the network-control center by the Internet or a local area network. In certain embodiments of the present invention, the network-control center may provide functionality similar to that provided by individual routers, including the ability to monitor the state of individual LMUs, define groups, define and modify schedules, manually control lighting fixtures, and carry out other such tasks that can be carried out on a local basis through the user interface provided by a router. In addition, the network-control center may provide additional functionality, not provided at the router level, including computationally complex analysis programs that monitor and analyze various characteristics of lighting systems, including power consumption, maintainability, and other such characteristics, over very large geographical areas.

The routers may be implemented in software that runs on a laptop or personal computer, such as router 611, may be stand-alone devices, such as routers 610 and 612, or may be stand-alone devices associated with a personal computer or workstation on which stand-alone routers display user interfaces provided to users, as in the case of router 613 in FIG. 6. Routers communicate with RF-enabled LMUs 630-640 via wireless communications, including IEEE802.15 (Zigbee) communications, and the RF-enabled LMUs may both control a particular lighting fixture as well as act as a bridge between additional end-point LMUs with which the bridge LMUs communicate via power-line communications, including Echelon Power Line (ANSI/EIA 709.1-A). In certain embodiments of the present invention, routers may communicate to LMUs via power-line communications, such as router 612 and LMU 633 in FIG. 6. In still further embodiments of the present invention, other types of communications may be employed for communicating information between network-control centers and routers, between routers and bridge LMUs or end-point LMUs, and between bridge LMUs and end-point LMUs. Various different chip sets and circuitry can be added to LMUs, routers, and components of network-control centers to enable additional types of communications pathways.

Both bridge LMUs and end-point LMUs control operation of lighting elements within light fixtures and collect data through various types of sensors installed in the light fixtures. Both types of LMUs control lighting-fixture operation autonomously, according to schedules downloaded into the LMUs from routers and network-control centers or default schedules installed at the time of manufacture, but may also directly control operational characteristics of lighting fixtures in response to commands received from routers and network-control centers. The schedules and other control directives stored within LMUs may be modified more or less arbitrarily by users interacting with user interfaces provided by routers and network-control centers. While, in many applications, the control functionality of the LMUs is a significant portion of the automated lighting-system control functionality provided by embodiments of the present invention, in many other applications, monitoring functionality provided by LMUs is of as great significance or greater significance. The LMUs architecture provides for connecting numerous different sensor inputs to LMUs, including motion-sensor inputs, chemical-detection-sensor inputs, temperature-sensing inputs, barometric-pressure-sensing inputs, audio and video signal inputs, and many other types of sensor inputs in addition to voltage and power sensors generally included in LMUs. The LMUs' response to each of the different types of input signals may be configured by users from user interfaces provided by routers and network-control centers. The various types of sensor input may be used primarily for providing effective control of lighting-system operation, in certain cases, but also may be used for providing a very large variety of different types of monitoring tasks, at local, regional, and large-geographical-area levels. LMU sensing can be employed, for example, for security monitoring, for monitoring of traffic patterns and detection of impending traffic congestion, for facilitating intelligent control of traffic signals, for monitoring local and regional meteorological conditions, for detecting potentially hazardous events, including gunshots, explosions, release of toxic chemicals into the environment, fire, seismic events, and many other types of events, real-time monitoring of which can provide benefits to municipalities, local government, regional governments, and many other organizations.

Figure 7:
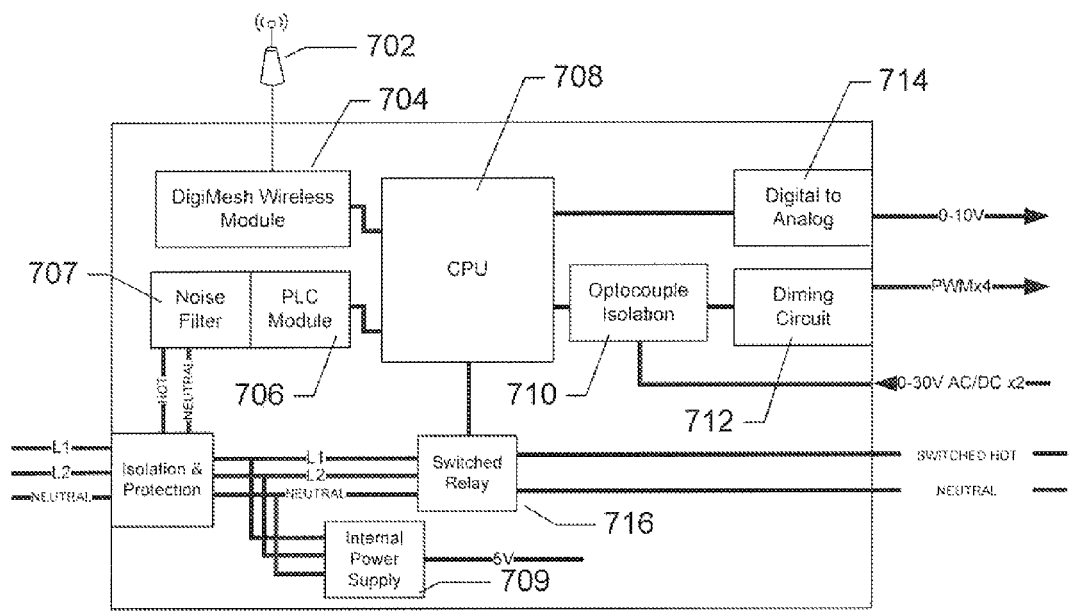
FIG. 7 provides a block diagram for a radio-frequency-enabled light-management unit according to one embodiment of the present invention.

FIG. 7 provides a block diagram for a radio-frequency-enabled light-management unit according to one embodiment of the present invention. The RF-enabled LMU includes an RF antenna 702, a wireless communications chip or chip set 704 that provides for wireless reception and transmission of command and response packets, a power-line-communications chip or chip set 706 that provides for power-line reception and transmission of command and response packets, a noise filter 707 that band-pass filters noise from the power-line connections, a CPU 708 and associated memories for running internal control programs that collect and store data, that control lighting-element operation according to stored data and stored programs, and that provide forwarding of packets from RF to PL communications and from PL to RF communications, an internal power supply that converts AC input power to DC internal power for supplying DC power to digital components, an optocouple isolation unit 710 that isolates the CPU from power surges, a dimming circuit 712 that provides digital pulse-width modulation of the electrical output to lighting elements to provide a range of output current for operating certain types of lighting elements over a range of light-intensity output, a digital-to-analog circuit 714 that provides controlled voltage output to lighting elements or other components, and a switched relay 716 for controlling power supply to various devices or components within a lighting fixture, including ballasts.

Figure 8:
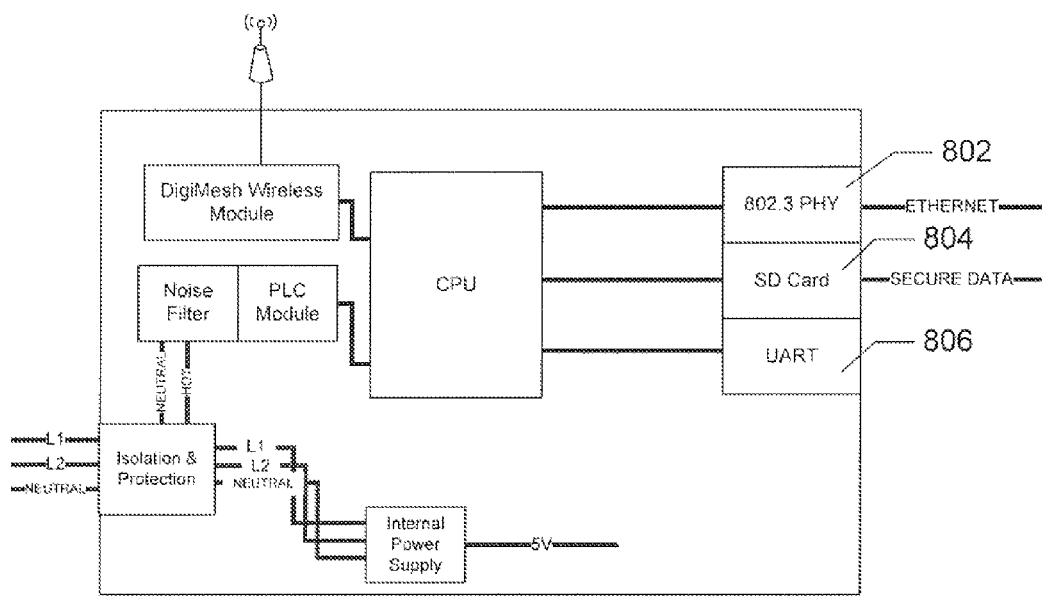
FIG. 8 provides a block diagram for a stand-alone routing device according to one embodiment of the present invention.

FIG. 8 provides a block diagram for a stand-alone routing device according to one embodiment of the present invention. The stand-alone routing device includes many of the same elements as included in the RF-enabled LMU, as shown in FIG. 7, with the addition of a local-area-network communications controller and port 802 and other communications components 804 and 806 that allow the stand-alone router to interconnect with a personal computer or workstation for display of a user interface.

Figure 9:
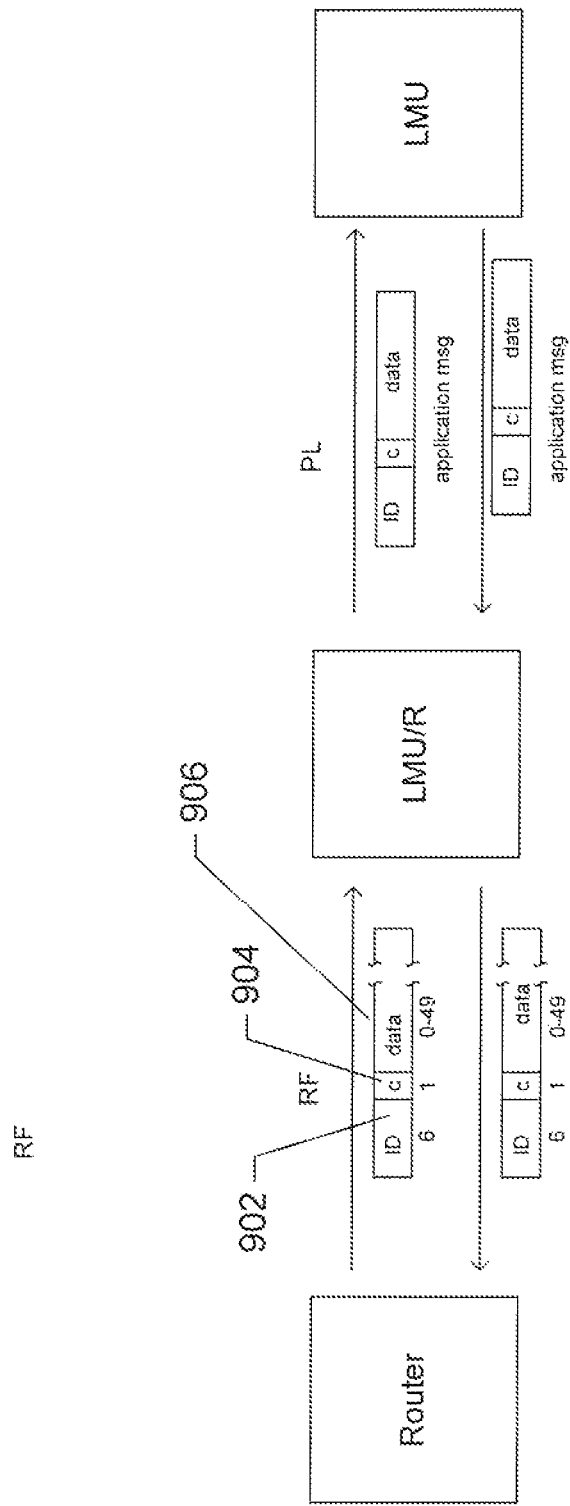
FIG. 9 illustrates communications between routers, radio-frequency-enabled light-management units, and end-point light-management units according to one embodiment of the present invention.

FIG. 9 illustrates communications between routers, radio-frequency-enabled light-management units, and end-point light-management units according to one embodiment of the present invention. Both commands and responses are encoded in packets comprising between seven and 56 bytes for RF communications. The RF communications protocol is a command/response protocol that allows routers to issue commands to RF-enabled LMUs and receive responses from those commands and that allows RF-enabled LMUs to issue commands to routers and receive responses to those commands from the routers. Broadcast messages and one-way messages are also provided for. Each command or response packet includes a six-byte ID 902, a single-byte command identifier or code 904, and between zero and 49 bytes of data 906. The ID 902 is used to identify particular LMU or RF-enabled LMUs from among the LMUs that communicate with the router. The commands and responses are packaged within power-line-communications applications packets for communications via power-line communications via the Echelon power-line communications protocol.

Figure 10:
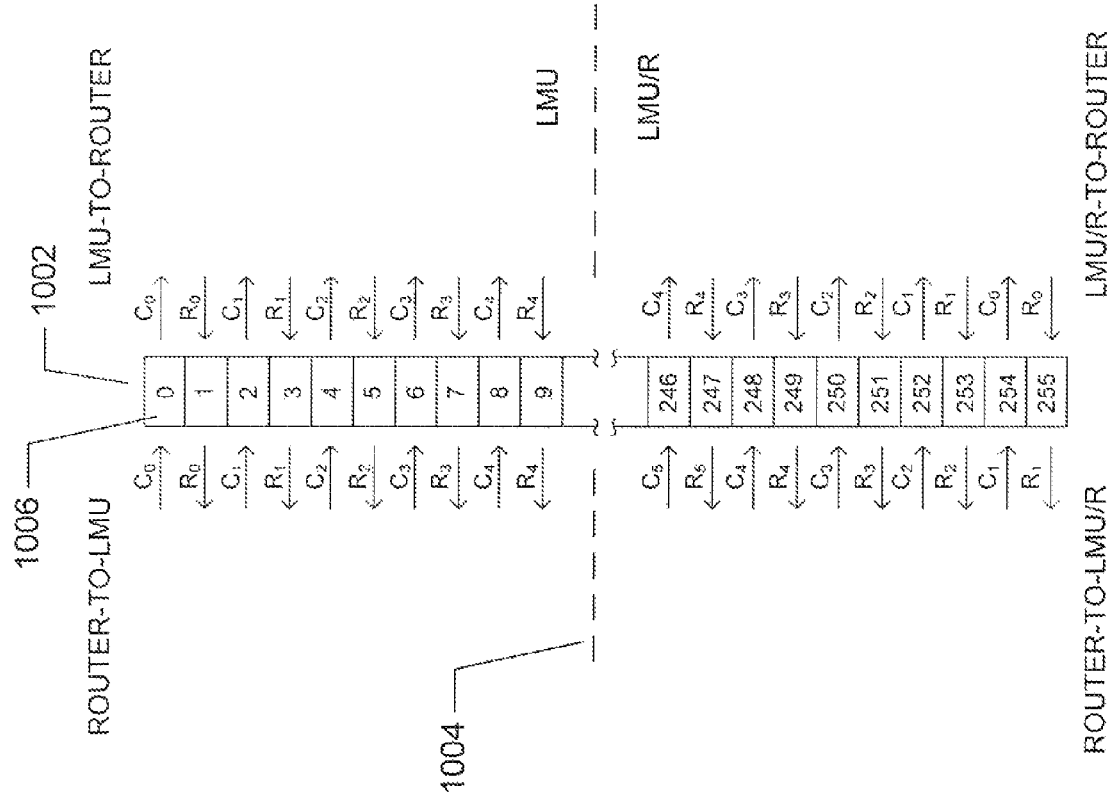
FIG. 10 illustrates division of the 256 possible command codes into four subsets, according to certain embodiments of the present invention.

FIG. 10 illustrates division of the 256 possible command codes into four subsets, according to certain embodiments of the present invention. In FIG. 10, a central horizontal column 1002 includes the 256 different possible command codes that can be represented by the one-byte command-code field within the communications packets used both for RF communications and PL communications. The even-numbered command codes correspond to commands, and the odd-numbered command codes correspond to responses, with the response for a particular command having a numeric value one greater than the numeric value of the command code for that particular command. Command codes and response codes for router-to-end-point-LMU commands have the lower-valued codes, represented as the code values above horizontal dashed line 1004. Router-to-bridge LMU commands have the higher-valued command codes, represented by the command codes below the horizontal dashed line 1004. Thus, a bridge LMU can immediately determine, from the command code, whether a command received from a router should be processed by the bridge LMU for local control of a light fixture or forwarded, via PL communications, to downstream LMUs. Similarly, the end-point-LMU-to-router commands have lower-numbered command codes and the bridge-LMU-to-muter commands have higher numerically valued command codes. Any particular command code, such as command code "0" 1006, may correspond to a router-to-LMU command or to an LMU-to-router command. The routers and LMUs can distinguish these different commands because the router receives only LMU-to-router commands and LMUs receive only router-to-LMU commands.

FIG. 11 shows the type of data stored within each light-management unit according to certain embodiments of the present invention. Each LMU stores information for each of up to a fixed number of lighting elements 1102-1105, a number of group identifiers 1112 that identify groups to which the LMU is assigned, various input/output device descriptors 1114, the status for each of various different events 1116, and a schedule 1118 comprising up to some maximum number of operational directives. Each set of information describing a particular lighting element, such as the information that describes lighting element "0" 1102, includes a lamp-status 1120 with a bit indicating whether or not the lighting element 1120 is powered on or off 1121 and a field indicating the degree to which the light is powered on with respect to the maximum light-intensity output of the light 1122. In addition, the total hours of operation for the lighting element 1124, total operation of the ballast associated with the lighting element 1126, and the number of power-on events associated with the lighting element 1128 are stored, along with various additional types of information, in particular embodiments of the present invention. Information regarding the light fixture 1108 includes a current power consumption 1130, a current or instantaneous voltage across the lighting fixture 1132, a current drawn by the lighting fixture 1134, an accumulated energy used by the lighting fixture 1136, flags that indicate whether particular alarms, other sensor inputs, or other input signals are active or inactive 1138, and a set of flags indicating whether or not particular relays and other output components are active or inactive 1140. Lighting fixture information also includes a cumulative light status 1142 that indicates whether or not any of the light elements associated with the light fixture are on or off. The status bits 1110 include a variety of different bit flags indicating various types of problems, including override events, sensor failures, and communications failures, absence of stored data needed for control of light-element operation, and other such events and characteristics. The I/O device descriptors 114 provide a description of the meaning of each of various input signals that can be monitored by the LMU. Each operational directive within the schedule 1118 includes an indication of the day 1150, start time 1152, end time 1154, and lamp status 1156 associated with the directive, as well as a group ID 1158 that indicates a group to which the directive applies.

Figure 12A:
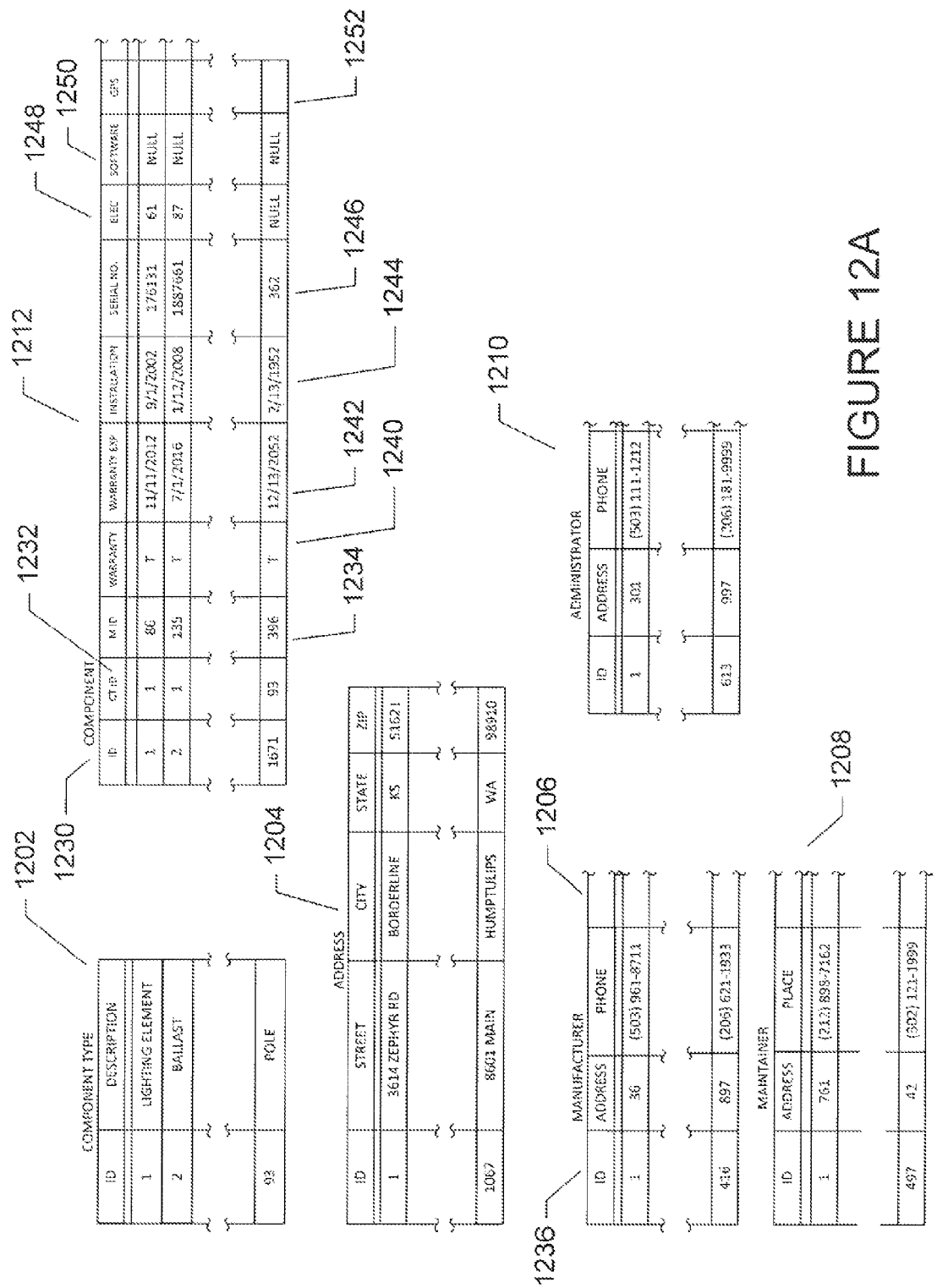
FIGS. 12A-B illustrate data managed by a router for all of the different light-management units or light-fixtures which the router manages according to certain embodiments of the present invention.
Figure 12B:
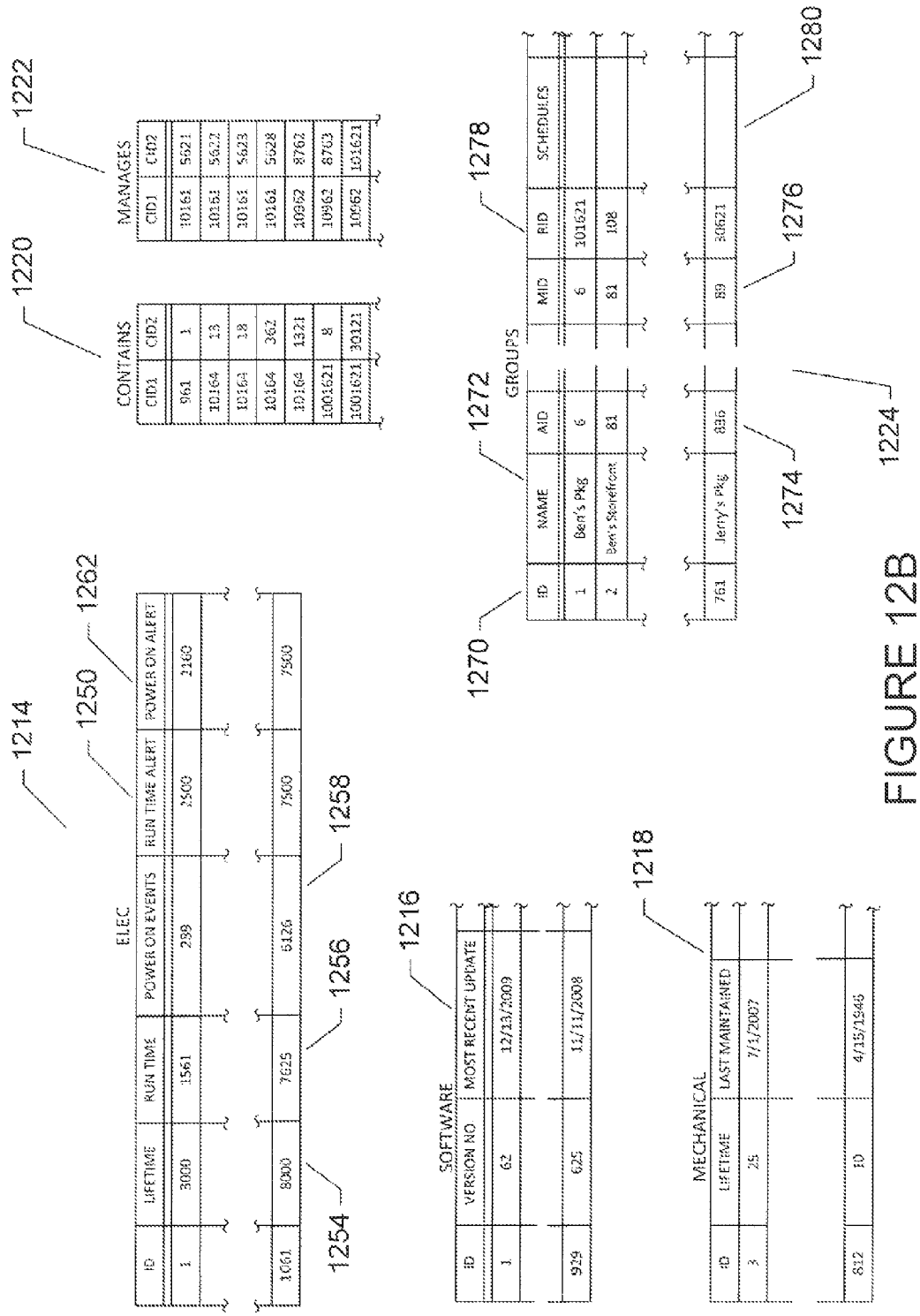

FIGS. 12A-B illustrate data managed by a router for all of the different light-management units or light-fixtures which the router manages according to certain embodiments of the present invention. In FIGS. 12A-B, a set, of relational-database tables are provided to indicate the types of information maintained by a router regarding the LMUs managed by the router. Of course, any number of various different database schemas may be designed to store and manage information for routers in alternative embodiments of the present invention. The relational tables shown in FIGS. 12A-B are intended to provide an exemplary database schema in order to illustrate the types of data stored within a router. The relational tables of the exemplary schema include: (1) Component Type 1202, which lists the various types of components within an automated lighting-control system, including internal components of lighting fixtures and lighting elements as well as LMUs, routers, and other components; (2) Address 1204, which includes various different addresses referenced from other tables; (3) Manufacturer 1206, which contains information about particular component manufacturers; (4) Maintainer 1208, which contains information about various maintenance individuals or organizations responsible for maintaining components of the automated lighting control system; (5) Administrator 1210, which contains information about various administrative organizations or individual administrators that administrate portions of the automated lighting-control system; (6) additional tables describing individuals or organizations responsible for supplying power, supplying various other services, and other such individuals and organizations, not shown in FIGS. 12A-B; (7) Components 1212, which stores detailed information about particular components within the automated lighting-control system; (8) Elec 1214, which stores detailed electrical characteristics of particular system components, the rows of which are referenced from rows of the Components table; (9) Software 1216, which stores detailed software characteristics of particular system components, the rows of which are referenced from rows of the Components table; (10) Mechanical 1218, which stores detailed mechanical characteristics of particular system components, the rows of which are referenced from rows of the Components table; (11) Contains 1220, which stores pairs of component IDs that form the relationship "contains," indicating the first component ID of the pair identifies a component that contains the component identified by the second component ID of the pair; (12) Manages 1222, which stores a "manages" relationship between components; and (13) Groups 1224, which contains information about various groups of LMUs defined for the router.

In the exemplary data schema shown in FIGS. 12A-B, the Component Type table 1202 contains ID/description pairs that describe each of the different types of components in the automated lighting system. The IDs, or identifiers, are used in the CT ID column of the Component table 1212. The Address 1204, Manufacturer 1206, Maintainer 1208, and Administrator 1210 tables include rows that provide descriptions of addresses, in the case of the Address table, and individuals or organizations, in the case of the Manufacturer, Maintainer, and Administrator tables. Each entry in the component table 1212 describes a different component within the automated lighting system. Each component is identified by an identifier, or ID, in the first column 1230 of the component table. Each component has a type, identified by the component-type identifier included in the second column 1232. Each component has a manufacturer, identified by a manufacturer ID in the third column 1234 of the Component table, where the manufacturer IDs are manufacturer identifiers provided in the first column 1236 of the Manufacturer table 1206. Components are additionally described by warranty information, in columns 1240 and 1242, an installation date, in column 1244, a serial number, in column 1246, references to rows in the Elec, Software, and other tables in columns 1248, 1250, and additional columns not shown in FIG. 12A, and by a GPS location, in column 1252. Many other types of information may be included in additional columns that describe components. The Elec table 1214 describes various electronic characteristics of a component, including the estimated lifetime, in column 1254, an accumulated runtime for the component, in column 1256, the number of power-on events associated with the component, in column 1258, and various thresholds, in columns 1260, 1262, and additional columns not shown in FIG. 12B, for triggering events associated with a component. As one example, column 1260 includes a run-time alert that specifies that the automated lighting-control system should take some action when the accumulated runtime hours are equal to or greater than the threshold value shown in column 1260. The Software and Mechanical tables 1216 and 1218 include various characteristics for software components and mechanical components. Each group, in the Groups table 1224, is described by an ID, in column 1270, a name, in column 1272, various IDs for administrators, maintainers, and other service providers associated with the group in columns 1274, 1276, and additional columns not shown in FIG. 12B, the component ID of a router associated with a group, in column 1278, and the current schedules for the group, in an unstructured column 1280.

Information stored in exemplary data schema shown in FIGS. 12A-B allows for responding to many different types of queries generated by user-interface routines executed on a router or network data center. For example, if a user of the router-provided user interface wishes to find all poles, or light fixtures, in the Supermall parking lot group, the following SQL query can be executed by router user-interface routines to provide serial numbers and GPS coordinates, for the identified poles:

```
Select GPS, SerialNo
From Component C, ComponentType CT
Where C.CTID = CT.ID AND
    CT. Description = 'pole' AND
    C.ID IN
        (Select CID2 From Manages M1
        Where M1.CID1 IN
            (Select CID2 From Manages M2
            Where M2.CID1 IN
                (Select RID From Groups G
                Where G.Name = 'Supermall Pkg'
                )
            )
        )
```

In certain embodiments of the present invention, a database stored locally within the router or stored in a database management system accessible to the router via the network-control center may automatically trigger generation of messages sent from the router to LMUs when data is added or updated. In other embodiments of the present invention, the user interface routines may execute queries to update the database, in response to user input through the user interface, and, at the same time, generate commands for transmission to LMUs, when appropriate. In certain cases, a separate, asynchronous router routine may periodically compare the contents of the database to information stored within the LMUs to ensure that the information content of the LMUs reflects the information stored within the database. In general, the information stored within the LMUs, including status, run-time characteristics, definitions of sensors, and other such information, is also stored in the database of the router.

Routers exercise control over LMUs through a command interface. FIG. 13 shows various commands used in router-to-light-management-unit communications according to certain embodiments of the present invention. These commands include: (1) the set-time command, which sets the time stored with an LMU; (2) the define-groups command, which sets entries in the list of groups (1112 in FIG. 11) to which an LMU belongs; (3) the define-schedule command, which is used to define schedules stored within LMUs; (4) the define-input/output command, which defines the various sensor devices and associated events within LMUs; (5) the force-lamp-state command, which provides for manual operation of a lighting unit via the LMU by a user interacting with the router through the user interface or, in alternative embodiments, by a user interacting with a cell phone; (6) the report-status command, which solicits status information by the router from LMUs; (7) the report-status-command reply, several forms of which are used to respond to report-status commands received by LMUs; (8) the event command, which reports events and which can be sent by any unit; (9) the set-operating-hours command, which allows the router to set various electrical characteristics for components within a lighting fixture maintained by an LMU; (10) the define-lamp-characteristics command, which allows the router to store particular lamp characteristics for lighting elements within the LMU that manages those lighting elements; (11) the firmware-update command, which prepares an LMU for reception of a firmware update; (12) the backdoor command, a debugging command used to obtain data from LMUs; and (13) the add/remove command, which informs a bridging LMU of the addition or deletion of an end-point LMU from the bridging LMU's power-line network. FIGS. 14A-N show the data contents of the various commands and replies discussed above with reference to FIG. 13. The tables describing data fields of messages, provided in FIGS. 14A-N, are self-explanatory, and are not discussed further.

Figure 15:
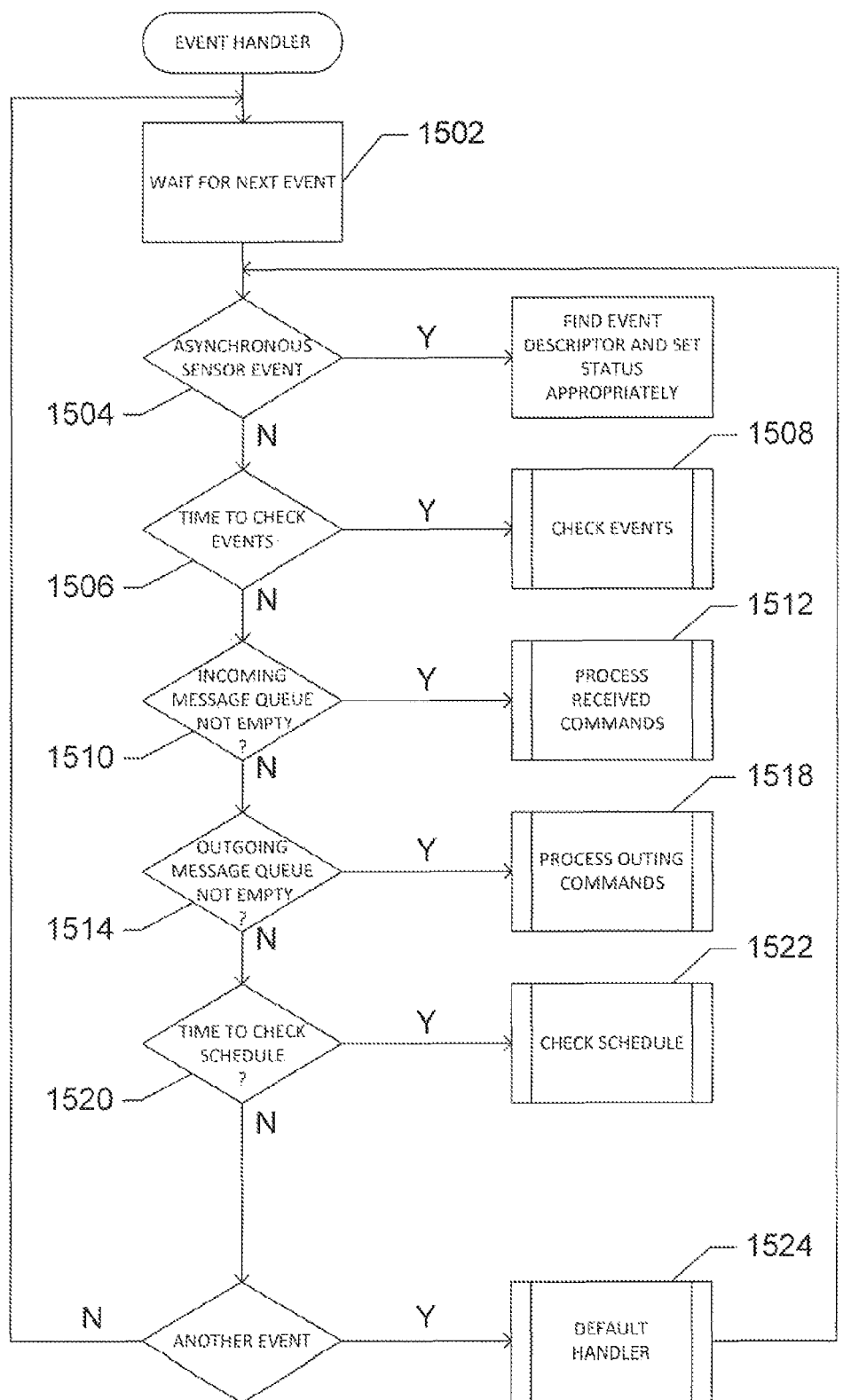
FIGS. 15-18 provide flow-control diagrams for the control functionality with a light-management unit according to one embodiment of the present invention.

FIGS. 15-18 provide flow-control diagrams for the control functionality with a light-management unit according to one embodiment of the present invention. FIG. 15 provides a control-flow diagram for an LMU event handler, which responds to events that arise within an LMU. The event handler waits for a next event to occur, in step 1502, and then determines which event has occurred, and responds to the event, in the set of conditional statements, such as conditional statement 1504, that follow the wait step 1502. The event handler runs continuously within the LMU. When an asynchronous sensor event has occurred, such as the output signal from a photocell transitioning from on to off or from off to on, as determined in step 1504, then the event descriptor for the event is found in the table of events (1116 in FIG. 11) and updated. When a timer has expired indicating that it is time to check the various events for which event descriptors are supplied in the list of events (1116 in FIG. 11), a check-events routine is called, in step 1508. When the event corresponds to queuing of an incoming message to an incoming message queue, as determined in step 1510, then a process-received-commands routine is called in step 1512. When the event corresponds to queuing of an outgoing message to an outgoing-message queue, as determined in step 1514, then a process-outgoing-commands routine is called in step 1518. When the event represents expiration of a timer controlling periodic checking of the stored operational schedule, as determined in step 1520, then a check-schedule routine is called in step 1522. Any of various other events that may occur are handled by a default event handler, evoked in step 1524. The events explicitly handled in FIG. 15 are merely a set of exemplary events, used to illustrate overall functionality of the LMU event handler.

Figure 16:
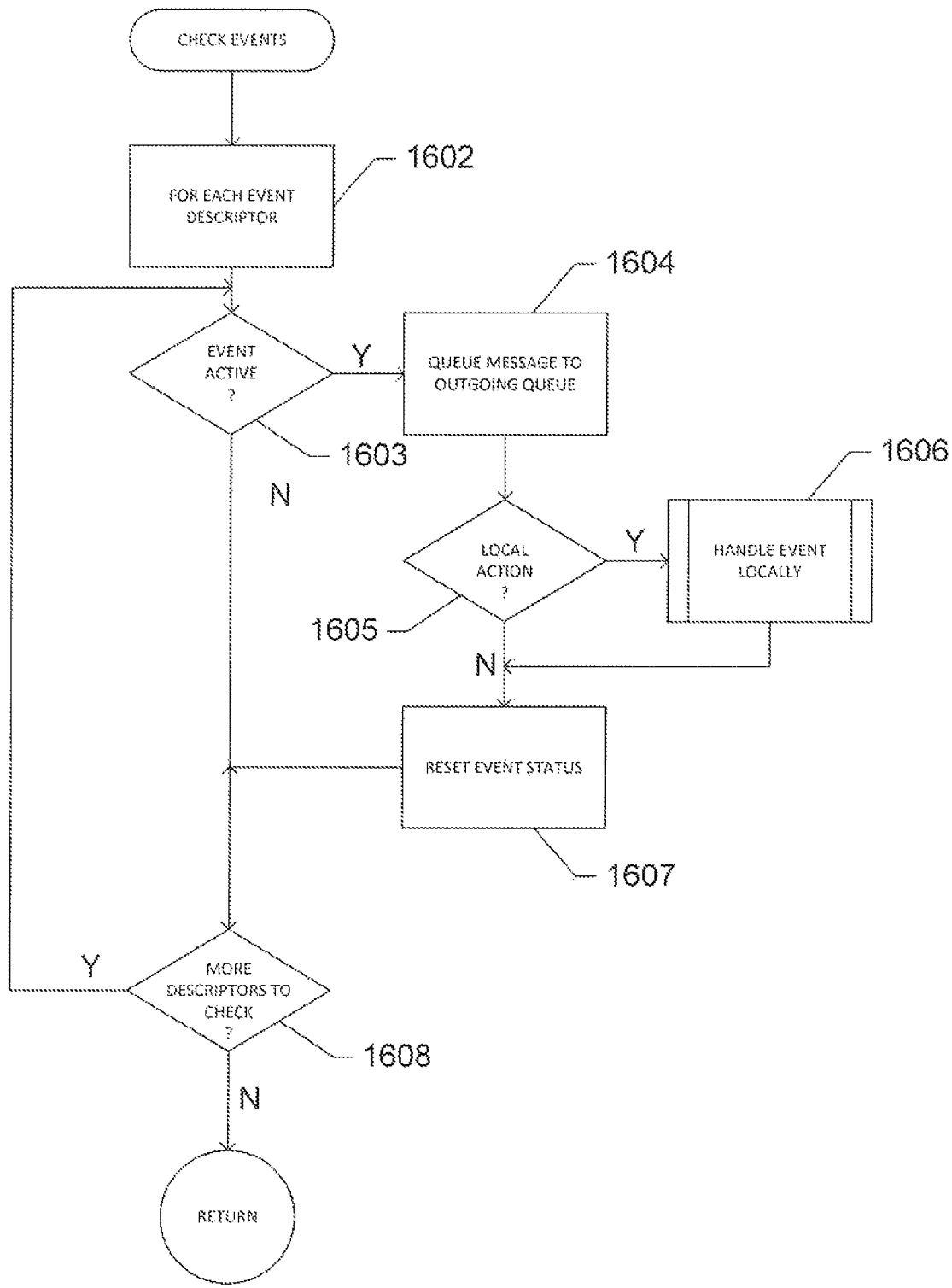

FIG. 16 provides a control-flow diagram of the check-events routine, called in step 1508 of FIG. 15. In the for-loop of steps 1602-1608, each event descriptor in the list of event descriptors (1116 in FIG. 11) within an LMU is considered. If the event is described as being active, or having more recently occurred than handled, then, in general, a message reporting the event is queued to an outgoing message queue, in step 1604, and, when local action is warranted, as determined in step 1605, the event is handled locally in step 1606. Following message queuing and local handling, the event status is reset, in step 1607. Other types of events may be reported, but not handled locally. Other types of events may both be reported to the router as well as handled locally. For example, a temperature-sensor event may elicit local activation or deactivation of a heating element in order to locally control temperature.

Figure 17:
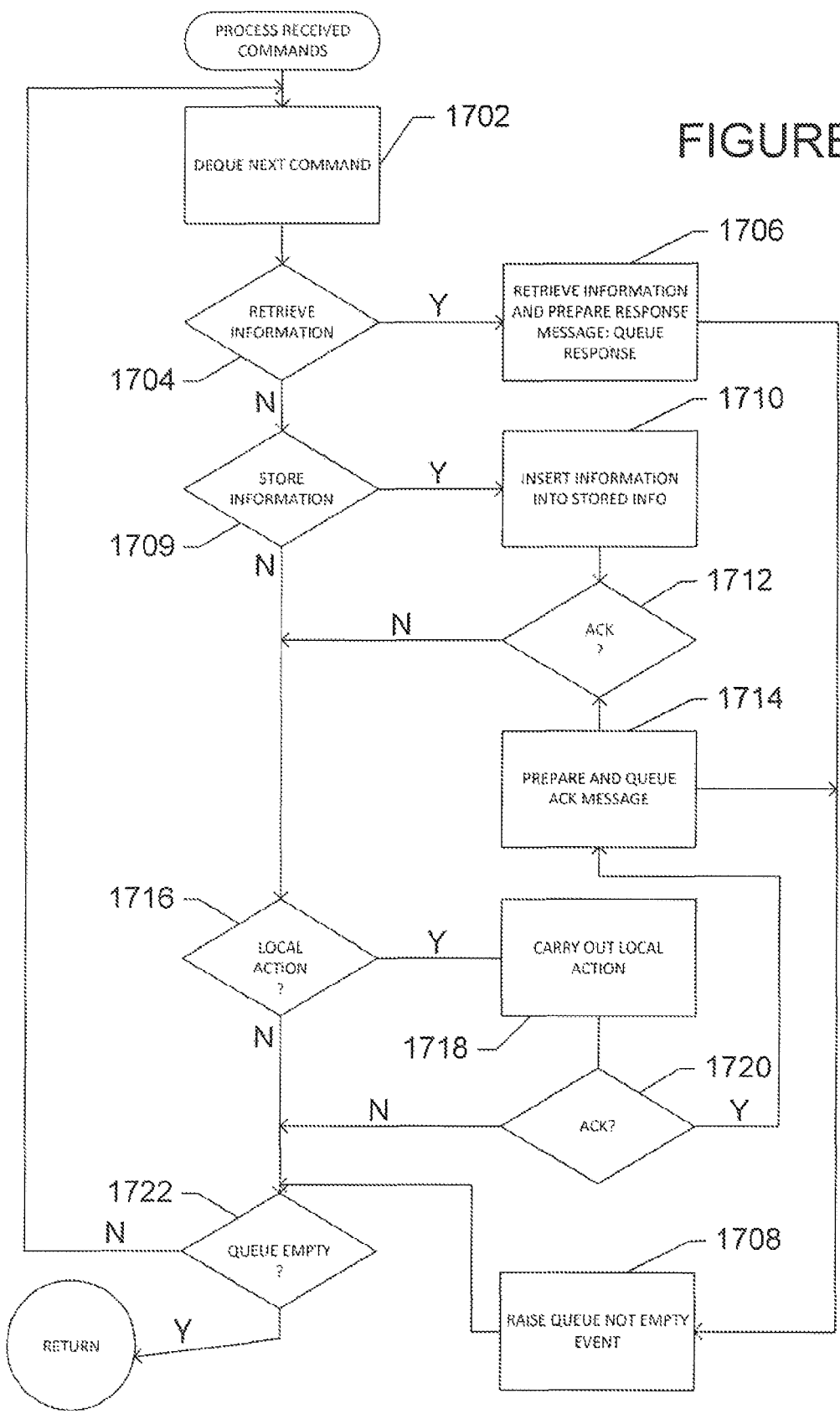

FIG. 17 provides a control-flow diagram of the routine "process received commands" called in step 1512 of FIG. 15. The next command is dequeued from an incoming command queue in step 1702. When the command is a retrieve-information command, as determined in step 1704, then the appropriate information is retrieved from the information stored by the LMU and included in a response message that is queued to an outgoing-message queue, in step 1706. A queue-not-empty event is raised, in step 1708, upon queuing the message to the outgoing message queue. When the command is a store-information command, as determined in step 1709, then information received in the command is stored into the appropriate data structure within the LMU, in step 1710. When an acknowledgement is needed, as determined in step 1712, then an acknowledgement message is prepared, in step. 1714, and queued to the outgoing message queue. When the command elicits local action, as determined in step 1716, then the local action is carried out in step 1718 and, when an acknowledgment message is required, as determined in step 1720, the acknowledgement message is prepared and queued in step 1714. When the command queue is empty, as determined in step 1722, then the routine ends. Otherwise, control returns to step 1702 for dequeuing the next received command.

Figure 18:
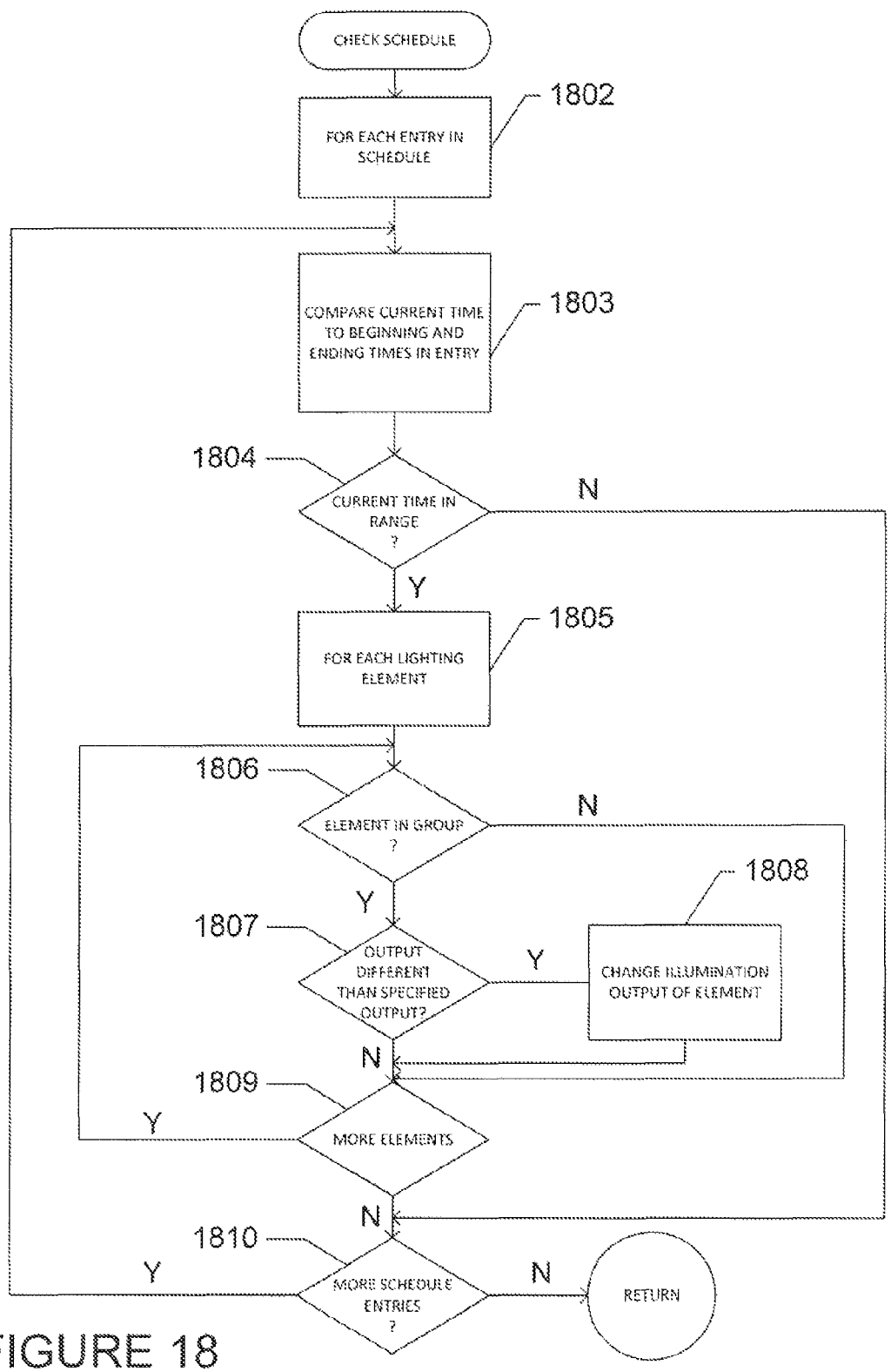

FIG. 18 provides a control-flow diagram for the routine "check schedule," called in step 1522 of FIG. 15. In the for-loop of steps 1802-1810, each entry in the schedule (1118 in FIG. 11) stored locally within the LMU is considered. Current time is compared to the start-time and end-time entries of the currently considered schedule, in step 1803. When the current time is within the range specified by the start-time and end-time entries of the currently considered schedule event or entry, then, in the inner for-loop of steps 1805-1809, each lighting element within the light fixture controlled by the LMU is considered. When the currently considered lighting element is within the group for which the schedule entry is valid, as determined by comparing the group ID of the schedule entry with the group ID of the lighting element, then when the current lighting-element output is different from that specified by the schedule, then, in step 1808, the LMU changes the output of the lighting element to that specified in the schedule by altering the voltage or current output to the lighting element.

Figure 19:
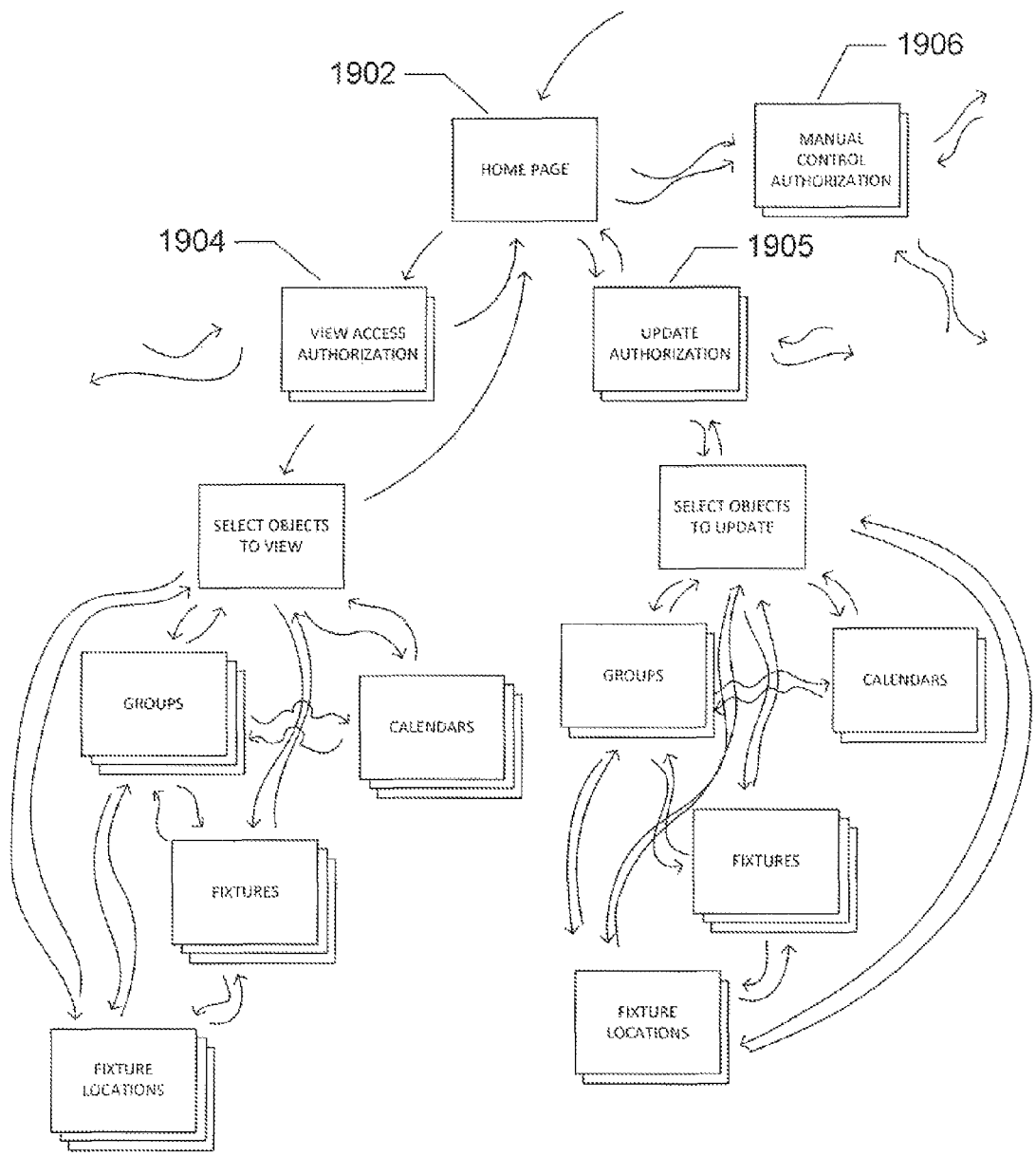
FIG. 19 provides a state-transition diagram for one router user interface that represents one embodiment of the present invention.

FIG. 19 provides a state-transition diagram for one router user interface that represents one embodiment of the present invention. When a user interacts through a user interface with a router, the router initially displays a home page 1902. The user may wish to view data, update and modify data, or manually control one or more LMUs and, in certain embodiments of the present invention, may select one of these three types of interactions and undergo authorization in order to carry out these types of actions through one or more authorization pages 1904-1906. Users may be required to provide passwords, pass fingers over fingerprint identifiers, provide other information that authorizes the user to carry out these and other types of tasks by interacting with the user interface. Various sets of web pages may allow a user to view or modify groups defined for LMUs and the association of LMUs with groups, calendar-like schedule of desired lighting operation, information regarding lighting fixtures and components contained within lighting fixtures, and information regarding fixture locations, including the ability to view fixture locations overlaid onto maps or photographic images of the area within which the LMUs are contained. There are a large number of different possible user interfaces that can be devised to provide interactive control of LMUs and lighting fixtures managed by a particular router. Similar user interfaces may be provided at the network-control center level.

Although the present invention has been described in terms of particular embodiments, it is not intended that the invention be limited to these embodiments. Modifications will be apparent to those skilled in the art. For example, a variety of different hardware configurations and designs may be used to implement end-point LMUs, bridge LMUs, routers, and network-control centers. As discussed above, many of various different communications methodologies can be employed for communications between hierarchical levels of components in an automated lighting-control system, according to embodiments of the present invention, by introducing proper chip sets, circuitry, and logic support within network-control-center hardware, router hardware, and LMU hardware. As discussed above, LM Us can be configured to accommodate many different types of sensor devices and to control many types of local electronic and electromechanical devices, such as heating elements, motors that control video cameras, and other such devices and components. Software and logic components of LMUs, routers, and network-control centers may be implemented in many different ways by varying any of the many different implementation parameters, including programming language, operating system platforms, control structures, data structures, modular organization, and other such parameters. Router and network-control-center user interfaces may be devised to provide many different types of automated lighting-system control and monitoring functionality. Lighting-fixture operation can be controlled by schedules, by specifying operational characteristics that follow particular events, can be controlled manually through manual-control user interfaces, and can be programmatically controlled in each of the different levels within the hierarchical automated lighting-system control systems that represent embodiments of the present invention, including relatively autonomous, programmatic control by individual LMUs.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. An automated lighting-control system comprising:
   two or more lighting fixtures, each containing one or more lighting elements;
   two or more lighting-fixture management units, each of the lighting fixtures including a lighting-fixture management unit, each lighting-fixture management unit storing control information and status information and controlling the intensity of light emitted by the lighting elements within the lighting-fixture, within a range of intensities, that contains the lighting-fixture management unit according to the stored control information; and
   a router that provides a user interface for creation and modification of operational schedules for automated control of the lighting elements within the lighting fixtures and that communicates with lighting-fixture management units, using a first communications medium between the router and at least one lighting-fixture management unit and additionally by an inter-lighting-fixture-management-unit communications medium, in order to transmit control information to the lighting-fixture management units and receive status information from the lighting-fixture management units;
   wherein lighting-fixture management units include bridge lighting-fixture management units and end-point lighting-fixture management units;
   wherein each end-point lighting-fixture management unit controls intensity of light emission from lighting elements within the lighting fixture that contains the end-point lighting-fixture management unit, according to an operational schedule and additional control directives stored within the end-point lighting-fixture management unit;
   wherein each end-point lighting-fixture management unit monitors input from one or more sensors and generates events, based on sensor input; and
   wherein each end-point lighting-fixture management unit collects and stores status information related to operation of components within the lighting fixture that contains the end-point lighting-fixture management unit.

2. The automated lighting-control system of claim 1 wherein one or more end-point lighting-fixture management units communicate with the router directly by power-line communications.

3. The automated lighting-control system of claim 1 wherein one or more end-point lighting-fixture management units communicate with the router directly by radio-frequency communications.

4. The automated lighting-control system of claim 1 wherein one or more end-point lighting-fixture management units communicate with the router indirectly through power-line communications to a bridge lighting-fixture management unit.

5. The automated lighting-control system of claim 1
wherein each bridge lighting-fixture management unit controls intensity of light emission from lighting elements within the lighting fixture that contains the bridge lighting-fixture management unit, according to an operational schedule and additional control directives stored within the bridge lighting-fixture management unit;
wherein each bridge lighting-fixture management unit monitors input from one or more sensors and generates events, based on sensor input;
wherein each bridge lighting-fixture management unit collects and stores status information related to operation of components within the lighting fixture that contains the bridge lighting-fixture management unit; and
wherein each bridge lighting-fixture management unit receives commands from the router for an end-point lighting-fixture management unit through the first communications medium and forwards the commands to the end-point lighting-fixture management unit by the inter-lighting-fixture-management-unit communications medium.

6. The automated lighting-control system of claim 1 wherein each lighting-fixture management unit stores status information related to operation of components within the lighting fixture that contains the lighting-fixture management unit that includes:
current voltage input to the lighting fixture;
current drawn by the lighting fixture;
power consumed by the lighting fixture over an interval of time;
indications of the occurrences of events indicated by sensor inputs;
total hours of operation of lighting elements; and
number of power-on events associated with lighting elements.

7. The automated lighting-control system of claim 1 wherein each lighting-fixture management unit comprises:
inter-lighting-fixture-management-unit communications medium chip or chip set that provides for power-line reception and transmission of command and response packets;
a noise filter that band-pass filters noise from a power-line connection,
a CPU and associated memories for running internal control programs that collect and store data, that control lighting-element operation according to stored data and stored programs;
an internal power supply that converts AC input power to DC internal power for supplying DC power to digital components,
an optocouple isolation unit that isolates the CPU from power surges;
a dimming circuit that provides digital pulse-width modulation of the electrical output to lighting elements to provide a range of output current for operating lighting elements over a range of light-intensity output;
a digital-to-analog circuit that provides controlled voltage output to lighting elements and/or other components; and
a switched relay for controlling power supply to various devices or components within the lighting fixture that contains the lighting-fixture management unit.

8. The automated lighting-control system of claim 1 wherein each lighting-fixture management unit stores data structures, in a memory component, that contain entries which represent:
an operational status of one or more lighting elements;
one or more group identifiers that identify groups to which the lighting-fixture management unit is assigned;
one or more input signals that can be monitored by the lighting-fixture management unit;
a status for each of one or more different events; and
a schedule that includes one or more operational directives.

9. The automated lighting-control system of claim 1 wherein the first communications medium is a radio-frequency communications medium and wherein the inter-lighting-fixture-management-unit communications medium is a power-line communications medium.

10. The automated lighting-control system of claim 9 wherein the router additionally communicates with remote computers by network communications, wherein the router additionally communicates with lighting-fixture management units by power-line communications, and wherein both the router and one or more lighting-fixture management units communicate with hand-held telecommunications devices using cellular-telephone communications.

11. The automated lighting-control system of claim 1 further including one or more additional routers that each communicates with one or more additional lighting-fixture management units.

12. The automated lighting-control system of claim 11 further including a network-control center that communicates, through network communications, with, and controls operation of, the routers.

13. The automated lighting-control system of claim 1 wherein the lighting-fixture management units include sensor components that monitor one or more of:
current;
voltage;
sound;
camera data;
volatile chemical substances;
power consumption by lighting-fixture components;
temperature; and
pressure.

* * * * *